United States Patent
Wolrich et al.

(10) Patent No.: US 7,337,275 B2
(45) Date of Patent: Feb. 26, 2008

(54) FREE LIST AND RING DATA STRUCTURE MANAGEMENT

(75) Inventors: Gilbert Wolrich, Framingham, MA (US); Mark B. Rosenbluth, Uxbridge, MA (US); Debra Bernstein, Sudbury, MA (US); John Sweeney, Harvard, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 10/218,682

(22) Filed: Aug. 13, 2002

(65) Prior Publication Data

US 2004/0034743 A1 Feb. 19, 2004

(51) Int. Cl.
*G06F 12/00* (2006.01)
(52) U.S. Cl. .......................................... 711/132; 710/52
(58) Field of Classification Search ................ 711/132; 710/52; 709/213, 214
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,881,173 A | 4/1975 | Larsen et al. |
| 3,913,074 A | 10/1975 | Homberg et al. |
| 3,940,745 A | 2/1976 | Sajeva |
| 4,023,023 A | 5/1977 | Bourrez et al. |
| 4,045,782 A | 8/1977 | Anderson et al. |
| 4,130,890 A | 12/1978 | Adam |
| 4,189,767 A | 2/1980 | Ahuja |
| 4,392,758 A | 7/1983 | Bowles et al. |
| 4,400,770 A | 8/1983 | Chan et al. |
| 4,514,807 A | 4/1985 | Nogi |
| 4,523,272 A | 6/1985 | Fukunaga et al. |
| 4,569,016 A | 2/1986 | Hao et al. |
| 4,724,521 A | 2/1988 | Carron et al. |
| 4,742,451 A | 5/1988 | Bruckert et al. |
| 4,745,544 A | 5/1988 | Renner et al. |
| 4,777,587 A | 10/1988 | Case et al. |
| 4,833,657 A | 5/1989 | Tanaka |
| 4,866,664 A | 9/1989 | Burkhardt, Jr. et al. |
| 4,868,735 A | 9/1989 | Moller et al. |

(Continued)

FOREIGN PATENT DOCUMENTS

EP  0 379 709  8/1990

(Continued)

OTHER PUBLICATIONS

Byrd et al., "Multithread Processor Architectures," *IEEE Spectrum*, vol. 32, No. 8, New York, Aug. 1, 1995, pp. 38-46.

(Continued)

*Primary Examiner*—Hiep T. Nguyen
(74) *Attorney, Agent, or Firm*—Fish & Richardson P.C.

(57) ABSTRACT

A method of managing a free list and ring data structure, which may be used to store journaling information, by storing and modifying information describing a structure of the free list or ring data structure in a cache memory that may also be used to store information describing a structure of a queue of buffers.

76 Claims, 17 Drawing Sheets

U.S. PATENT DOCUMENTS

| | | |
|---|---|---|
| 4,992,934 A | 2/1991 | Portanova et al. |
| 5,008,808 A | 4/1991 | Fries et al. |
| 5,073,864 A | 12/1991 | Methvin et al. |
| 5,113,516 A | 5/1992 | Johnson |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,166,872 A | 11/1992 | Weaver et al. |
| 5,168,555 A | 12/1992 | Byers et al. |
| 5,173,897 A | 12/1992 | Schrodi et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fujiwara et al. |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,109 A | 7/1997 | Griesmer et al. |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,717,760 A | 2/1998 | Satterfield |
| 5,717,898 A | 2/1998 | Kagan et al. |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,839 A | 9/1998 | Hoyt et al. |
| 5,812,868 A | 9/1998 | Moyer et al. |
| 5,813,031 A * | 9/1998 | Chou et al. .................. 711/122 |
| 5,815,714 A | 9/1998 | Shridhar et al. |
| 5,815,799 A | 9/1998 | Barnes et al. |
| 5,819,080 A | 10/1998 | Dutton et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A * | 4/1999 | Lau et al. .................... 711/153 |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,978,874 A | 11/1999 | Singhal et al. |
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,170 A * | 2/2000 | Garger et al. ................ 707/100 |
| 6,029,228 A | 2/2000 | Cai et al. |
| 6,047,334 A | 4/2000 | Langendorf et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |
| 6,072,781 A | 6/2000 | Feeney et al. |

| Patent Number | Date | Inventor(s) |
|---|---|---|
| 6,073,215 A | 6/2000 | Snyder |
| 6,076,129 A | 6/2000 | Fenwick et al. |
| 6,076,158 A | 6/2000 | Sites et al. |
| 6,079,008 A | 6/2000 | Clery, III |
| 6,079,014 A | 6/2000 | Papworth et al. |
| 6,085,215 A | 7/2000 | Ramakrishnan et al. |
| 6,085,294 A | 7/2000 | Van Doren et al. |
| 6,088,783 A | 7/2000 | Morton |
| 6,092,127 A | 7/2000 | Tausheck |
| 6,092,158 A | 7/2000 | Harriman et al. |
| 6,092,175 A | 7/2000 | Levy et al. |
| 6,112,016 A | 8/2000 | MacWilliams et al. |
| 6,115,811 A | 9/2000 | Steele, Jr. |
| 6,134,665 A | 10/2000 | Klein et al. |
| 6,141,348 A | 10/2000 | Muntz |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,145,123 A | 11/2000 | Torrey et al. |
| 6,157,955 A | 12/2000 | Narad et al. |
| 6,160,562 A | 12/2000 | Chin et al. |
| 6,173,349 B1 | 1/2001 | Qureshi et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,602 B1 * | 4/2001 | Wicki et al. ............... 711/122 |
| 6,212,604 B1 | 4/2001 | Tremblay |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,277 B1 | 4/2001 | Karguth |
| 6,223,279 B1 | 4/2001 | Nishimura et al. |
| 6,230,119 B1 | 5/2001 | Mitchell |
| 6,230,261 B1 | 5/2001 | Henry et al. |
| 6,233,599 B1 | 5/2001 | Nation et al. |
| 6,247,025 B1 | 6/2001 | Bacon |
| 6,247,040 B1 | 6/2001 | Born et al. |
| 6,247,086 B1 | 6/2001 | Allingham |
| 6,249,829 B1 | 6/2001 | Bloks et al. |
| 6,256,713 B1 | 7/2001 | Audityan et al. |
| 6,272,616 B1 | 8/2001 | Fernando et al. |
| 6,275,505 B1 | 8/2001 | O Loughlin, et al. |
| 6,278,289 B1 | 8/2001 | Guccione et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,311,256 B2 | 10/2001 | Halligan et al. |
| 6,324,624 B1 | 11/2001 | Wolrich et al. |
| 6,345,334 B1 | 2/2002 | Nakagawa et al. |
| 6,347,344 B1 | 2/2002 | Baker et al. |
| 6,351,808 B1 | 2/2002 | Joy et al. |
| 6,356,962 B1 | 3/2002 | Kasper et al. |
| 6,357,016 B1 | 3/2002 | Rodgers et al. |
| 6,360,262 B1 | 3/2002 | Guenthner et al. |
| 6,366,978 B1 | 4/2002 | Middleton et al. |
| 6,373,848 B1 | 4/2002 | Allison et al. |
| 6,378,124 B1 | 4/2002 | Bates et al. |
| 6,381,668 B1 | 4/2002 | Lunteren |
| 6,389,449 B1 | 5/2002 | Nemirovsky et al. |
| 6,393,483 B1 | 5/2002 | Latif et al. |
| 6,401,149 B1 | 6/2002 | Dennin et al. |
| 6,408,325 B1 | 6/2002 | Shaylor |
| 6,415,338 B1 | 7/2002 | Habot |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,430,646 B1 | 8/2002 | Thusoo et al. |
| 6,434,145 B1 | 8/2002 | Opsasnick et al. |
| 6,449,289 B1 | 9/2002 | Quicksall |
| 6,457,078 B1 | 9/2002 | Magro et al. |
| 6,463,072 B1 | 10/2002 | Wolrich et al. |
| 6,480,943 B1 | 11/2002 | Douglas et al. |
| 6,490,642 B1 | 12/2002 | Thekkath et al. |
| 6,496,925 B1 | 12/2002 | Rodgers et al. |
| 6,505,229 B1 | 1/2003 | Turner et al. |
| 6,505,281 B1 | 1/2003 | Sherry |
| 6,513,089 B1 | 1/2003 | Hofmann et al. |
| 6,523,108 B1 | 2/2003 | James et al. |
| 6,529,999 B1 | 3/2003 | Keller et al. |
| 6,532,509 B1 | 3/2003 | Wolrich et al. |
| 6,539,439 B1 | 3/2003 | Nguyen et al. |
| 6,552,826 B2 | 4/2003 | Adler et al. |
| 6,560,667 B1 | 5/2003 | Wolrich et al. |
| 6,570,877 B1 | 5/2003 | Kloth et al. |
| 6,577,542 B2 | 6/2003 | Wolrich et al. |
| 6,577,625 B1 * | 6/2003 | Chiou et al. ............... 370/381 |
| 6,581,124 B1 | 6/2003 | Anand |
| 6,584,522 B1 | 6/2003 | Wolrich et al. |
| 6,587,905 B1 | 7/2003 | Correale et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,628,652 B1 * | 9/2003 | Chrin et al. ............... 370/386 |
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,633,938 B1 | 10/2003 | Rowlands et al. |
| 6,643,726 B1 | 11/2003 | Patkar et al. |
| 6,654,836 B1 | 11/2003 | Misra et al. |
| 6,661,794 B1 | 12/2003 | Wolrich et al. |
| 6,661,795 B1 | 12/2003 | Adas et al. |
| 6,667,920 B2 | 12/2003 | Wolrich et al. |
| 6,668,311 B2 | 12/2003 | Hooper et al. |
| 6,668,317 B1 | 12/2003 | Bernstein et al. |
| 6,671,761 B2 | 12/2003 | Kim |
| 6,671,827 B2 | 12/2003 | Guilford et al. |
| 6,678,248 B1 * | 1/2004 | Haddock et al. ............ 370/235 |
| 6,681,300 B2 | 1/2004 | Wolrich et al. |
| 6,684,361 B2 | 1/2004 | Tong et al. |
| 6,694,380 B1 | 2/2004 | Wolrich et al. |
| 6,697,923 B2 * | 2/2004 | Chen et al. ............... 711/154 |
| 6,724,767 B1 * | 4/2004 | Chong et al. ............... 370/412 |
| 6,725,313 B1 | 4/2004 | Wingard et al. |
| 6,728,845 B2 | 4/2004 | Adiletta et al. |
| 6,738,831 B2 | 5/2004 | Wolrich et al. |
| 6,754,662 B1 | 6/2004 | Li |
| 6,754,795 B2 * | 6/2004 | Chen et al. ............... 711/170 |
| 6,781,992 B1 * | 8/2004 | Rana et al. ............... 370/394 |
| 6,785,843 B1 | 8/2004 | McRae et al. |
| 6,823,399 B2 | 11/2004 | Horiguchi et al. |
| 6,826,180 B1 | 11/2004 | Bergantino et al. |
| 6,847,645 B1 | 1/2005 | Potter et al. |
| 6,868,476 B2 | 3/2005 | Rosenbluth et al. |
| 6,889,319 B1 | 5/2005 | Rodgers et al. |
| 6,941,438 B2 | 9/2005 | Wolrich et al. |
| 6,958,973 B1 * | 10/2005 | Chen et al. ............... 370/235 |
| 7,028,118 B2 | 4/2006 | Smith et al. |
| 7,051,329 B1 | 5/2006 | Boggs et al. |
| 7,089,379 B1 | 8/2006 | Sharma et al. |
| 7,216,204 B2 | 5/2007 | Rosenbluth et al. |
| 7,225,281 B2 | 5/2007 | Rosenbluth et al. |
| 2001/0043614 A1 | 11/2001 | Viswanadham et al. |
| 2002/0053017 A1 | 5/2002 | Adiletta et al. |
| 2002/0056037 A1 | 5/2002 | Wolrich et al. |
| 2003/0012198 A1 | 1/2003 | Kaganoi et al. |
| 2003/0041216 A1 | 2/2003 | Rosenbluth et al. |
| 2003/0041228 A1 | 2/2003 | Rosenbluth et al. |
| 2003/0046488 A1 | 3/2003 | Rosenbluth et al. |
| 2003/0065862 A1 | 4/2003 | Wyland |
| 2003/0078950 A1 | 4/2003 | Abernathy et al. |
| 2003/0105899 A1 | 6/2003 | Rosenbluth et al. |

| | | | |
|---|---|---|---|
| 2003/0145155 | A1 | 7/2003 | Wolrich et al. |
| 2003/0145159 | A1 | 7/2003 | Adiletta et al. |
| 2003/0191866 | A1 | 10/2003 | Wolrich et al. |
| 2004/0034743 | A1 | 2/2004 | Wolrich et al. |
| 2004/0039895 | A1 | 2/2004 | Wolrich et al. |
| 2004/0054880 | A1 | 3/2004 | Bernstein et al. |
| 2004/0071152 | A1 | 4/2004 | Wolrich et al. |
| 2004/0073728 | A1 | 4/2004 | Wolrich et al. |
| 2004/0073778 | A1 | 4/2004 | Adiletta et al. |
| 2004/0098496 | A1 | 5/2004 | Wolrich et al. |
| 2004/0109369 | A1 | 6/2004 | Wolrich et al. |
| 2004/0139290 | A1 | 7/2004 | Wolrich et al. |
| 2004/0205747 | A1 | 10/2004 | Bernstein et al. |
| 2005/0132132 | A1 | 6/2005 | Rosenbluth et al. |
| 2005/0185437 | A1 | 8/2005 | Wolrich et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| JP | 59111533 | 6/1984 |
| WO | WO94/15287 | 7/1994 |
| WO | WO97/38372 | 10/1997 |
| WO | WO 00/33195 | 6/2000 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

Doyle et al., *Microsoft Press Computer Dictionary*, 2$^{nd}$ed., Microsoft Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

"HART, Field Communications Protocol, Application Guide", 'Online!1999, Hart Communication Foundation, Austin, TX, XP002219606, http://lhc-div.web.cern.ch/lhc-div/IAS/WS/WorldFip/Labo/appguide.pdf.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5$^{th}$ Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Romilly Bowden, "What is HART?," Romilly's Hart and Fieldbus Web Site, Online!, 1977, XP002219605, http://www.romilly.co.uk/whathart.htm.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28$^{th}$Annual Hawaii International Conference on System Sciences, 1995, pp. 191-201.

Trimberger et al, "A time-multiplexed FPGA," Proceedings of the 5$^{th}$Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

Shu-Ping Chang, et al., *An Overview of the Pipelined Common Buffer Architecture (PCBA) for Memory Based Packet/Cell Switching Systems*, pp. 288-297, IEEE Oct. 2, 1994.

Yu-Sheng Lin et al., *Queue Management for Shared Buffer and Shared Multi-buffer ATM Switches*, pp. 688-695, IEEE, Mar. 24, 1996.

Gregory L. Frazier, et al., *The Design and Implementation of a Multi-Queue Buffer for VLSI Communication Switches*, pp. 466-471, IEEE 1989.

"Intel IXP1200 Network Processor Family", Hardware Reference Manual, 272 pages (Dec. 2001).

"IXP1200 Network Processor", Data Sheet, pp. 19-151 (Mar. 2000).

*C-5 Network Processor Architecture Guide*, C-Port Corporation, Freescale Semiconductor, Inc., Part No. C5NPD0-AG/D, May 31, 2001, 642 pages.

Agarwal et al., "April: A Processor Architecture for Multiprocessing, "Proceedings of the 17$^{th}$ Annual International Symposium on Computer Architecture, IEEE, pp. 104-114.

Chang et al., "Branch Classification: A New Mechanism for Improving Branch Predictor Performance, "IEEE, pp. 22-31 (1994).

Farkas et al., "The multicluster architecture: reducing cycle time through partitioning, "IEEE, vol. 30, Dec. 1997, pp. 149-159.

Hennessy et al., "Computer Organization and Design: The Hardware/Software Interface, "Morgan Kaufman Publishers, 1998, pp. 116-119, 181-182, 225-227, 466-470, 476-482, 510-519, 712.

Intel, "IA-64 Application Developer's Architecture Guide, "Rev. 1.0, May 1999, pp. 2-2, 4-29, to 4-31, 7-116 to 7-118 and c-21.

Keckler et al., "Exploiting fine grain thread level parallelism on the MIT multi-ALU processor, "IEEE, Jun. 1998.

Mendelson A. et al., "Design Alternatives of Multithreaded Architecture", *International Journal of Parallel Programming*, Plenum Press, New York , 27(3): 161-193, Jun. 1999.

Paver et al., "Register Locking in Asynchronous Processor Computer Design: VLSI Processors, "ICCD '92 Proceedings, IEEE 1992 International Conference, 1992, pp. 351-355.

Wadler, "The Concatenate Vanishes, "University of Glasgow, Dec. 1987 (revised Nov. 1989), pp. 1-7.

Waldspurger et al., "Register Relocation: Flexible Contents for Multithreading, "Proceedings of the 20th Annual International Symposium on Computer Architecture, 1993, pp. 120-130.

\* cited by examiner

FREE LIST AND RING DATA STRUCTURE MANAGEMENT

BACKGROUND

This application relates to free list and ring data structure management.

A network processor may buffer data packets dynamically by storing received data in linked memory buffers. After the data associated with a particular buffer have been transmitted, that buffer may be returned to a pool, called a "free list," where available buffers are stored.

A network processor may also buffer data packets using statically allocated, e.g., predefined memory buffers. A ring data structure includes such predefined memory locations. A pointer may be used to track the insertion location of the ring data structure. Another pointer may be used to track the removal location of the ring data structure.

Managing a large number of pools and buffers efficiently may be an important factor in the operation and cost of network processors.

DETAILED DESCRIPTION

Figure 1:
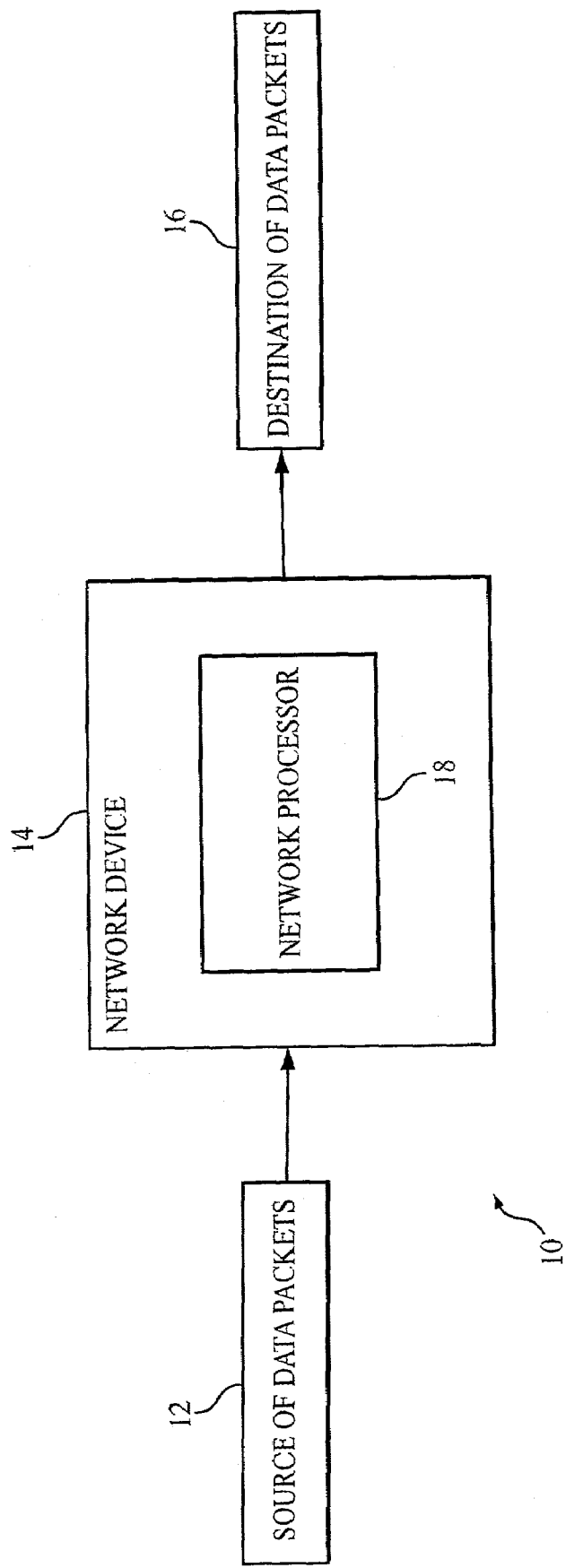
FIG. 1 is a block diagram that illustrates a system that includes a pipelined network processor.

Referring to FIG. 1, a network system 10 for processing data packets includes a source 12 of data packets coupled to an input of a network device 14, such as an interface to other network devices. An output of the network device 14 is coupled to a destination 16 of data packets, such as an interface to other network devices. The network device 14 may include a network processor 18 having a memory for operating on memory data structures. The processor executes instructions and operates with the memory data structures as configured to store and forward the data packets to a specified destination. The data packets received in the network processor are network packets. Network device 14 may include or be part of, for example, a network switch or a network router. The source of data packets 12 may include an interface to other network devices connected over a communications path operating at high data packet transfer line speeds, such as, an optical carrier 10 gigabit line (i.e., OC-192) or other line speeds. The destination 16 of data packets may include a similar network connection or interface.

Figure 2:
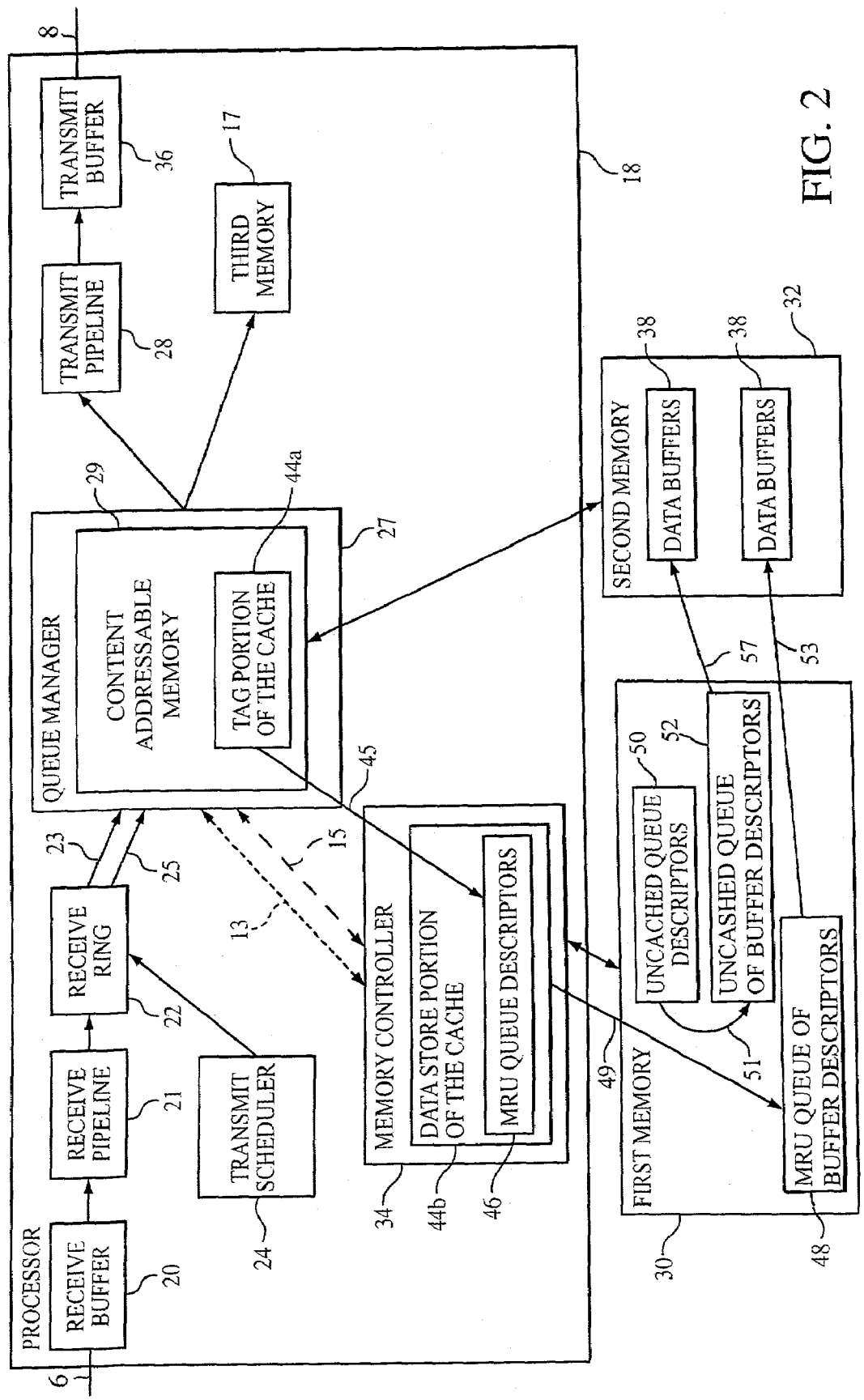
FIG. 2 is a block diagram that illustrates an exemplary pipelined network processor.

Referring to FIG. 2, the network processor 18 has multiple programming engines that function, respectively, as a receive pipeline 21, a transmit scheduler 24, a queue manager 27 and a transmit pipeline 28. Each programming engine has a multiple-entry content addressable memory (CAM) to track N of the most recently used queue descriptors where N is the number of entries in the CAM. For example, the queue manager 27 includes the CAM 29. The network processor 18 includes a memory controller 34 that is coupled to a first memory 30 and second memory 32. A third memory 17 includes software instructions for causing the engines to operate as discussed in detail below. Although the illustrated implementation uses separate memories, a single memory may be used to perform the tasks of the first and second memory mentioned above. The memory controller 34 initiates queue commands in the order in which they are received and exchanges data with the queue manager 27. The first memory 30 has a memory space for storing data. The second memory 32 is coupled to the queue manager 27 and other components of the network processor 18.

As shown in FIG. 2, the first memory 30 and the second memory 32 reside externally to the network processor 18. Alternatively, the first memory 30 and/or the second memory 32 may be internal to the network processor 18. The processor 18 also includes hardware interfaces 6, 8 to a receive bus and a transmit bus that are coupled to receive and transmit buffers 20, 36.

The receive buffer 20 is configured to buffer data packets received from the source 12 of data packets. Each data packet may contain a real data portion representing the actual data being sent to the destination, a source data portion representing the network address of the source of the data, and a destination data portion representing the network address of the destination of the data. The receive pipeline 21 is coupled to the output of the receive buffer 20. The receive pipeline 21 also is coupled to a receive ring 22, which may have a first-in-first-out (FIFO) data structure. The receive ring 22 is coupled to the queue manager 27.

The receive pipeline 21 is configured to process the data packets from the receive buffer 20 and store the data packets in data buffers included in memory addresses 38 in the second memory 32. The receive pipeline 21 makes requests 23 to the queue manager 27 through the receive ring 22 to append a buffer to the end of a queue.

Once the data packets are processed by the receive pipeline 21, the receive pipeline may generate enqueue requests 23 directed to the queue manager 27. The receive pipeline 21 may include multi-threaded programming engines working in a pipelined manner. The engines receive packets, classify them, and store them on an output queue based on the classification. This receive processing determines an output queue for each packet. By pipelining, the programming engine may perform the first stage of execution of an instruction and, when the instruction passes to the next stage, a new instruction may be started. The processor does not have to lie idle while waiting for the first instruction to be completed. Therefore, pipelining may lead to improvements in system performance. An enqueue request represents a request to append a buffer descriptor that describes a newly received buffer to the last buffer descriptor in a queue of buffer descriptors 48 in the first memory 30. The receive pipeline 21 may buffer several packets before generating an enqueue request. Consequently, the total number of enqueue requests generated may be reduced.

The transmit scheduler 24 is coupled to the queue manager 27 through the receive ring 22 and is responsible for generating dequeue requests 25 based on specified criteria. Such criteria may include the time when the number of buffers in a particular queue of buffers reaches a predetermined level. The transmit scheduler 24 determines the order of packets to be transmitted. A dequeue request 25 represents a request to remove the first buffer from the queue 48. The transmit scheduler 24 also may include scheduling algorithms for generating dequeue requests 25 such as "round robin", priority-based or other scheduling algorithms. The transmit scheduler 24 may be configured to use congestion avoidance techniques such as random early detection (RED) which involves calculating statistics for the packet traffic. The transmit scheduler maintains a bit for each queue signifying whether the queue is empty.

The queue manager 27, which in one implementation is provided by a single multi-threaded programming engine, processes enqueue requests from the receive pipeline 21 as well as dequeue requests from the transmit scheduler 24. The queue manager 27 allows for dynamic memory allocation by maintaining linked list data structures for each queue.

Figure 3:
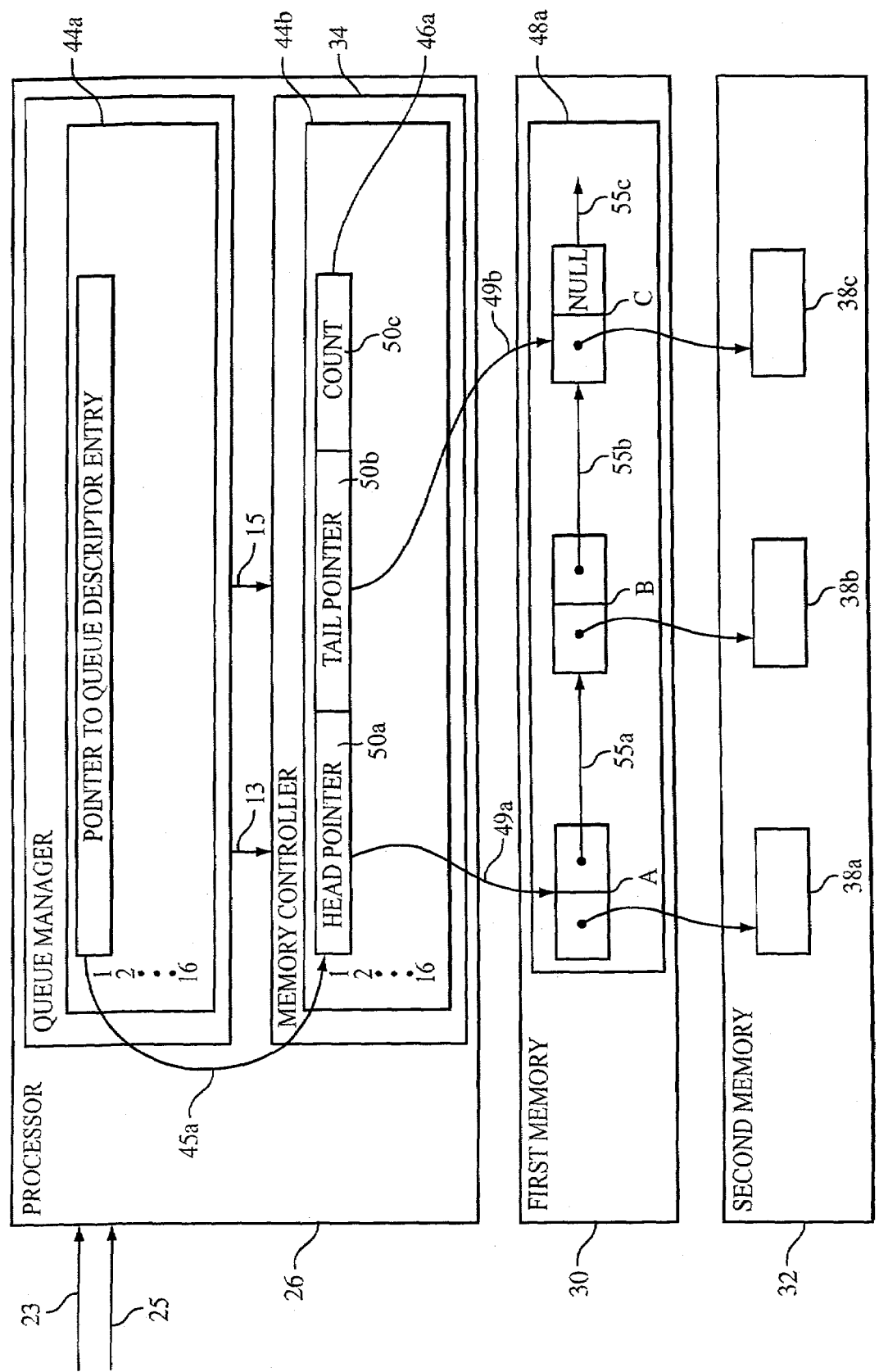
FIG. 3 is a block diagram of an exemplary cache data structure.

The queue manager 27 includes software components configured to manage a cache of data structures that describe the queues ("queue descriptors"). As shown in FIG. 3, a queue descriptor 46a includes a head pointer 50a which points to the first entry A of a queue, a tail pointer 50b which points to the last entry C of the queue, and a count field 50c which indicates the number of entries currently on the queue. The word alignment of the address of the head pointer for all queue descriptors should be a power of two because it is more efficient to work in powers of two when accessing memory to find queue descriptors.

Referring to FIG. 2, the cache has a tag portion 44a and a data store portion 44b. The tag portion 44a of the cache resides in the queue manager 27, and the data store portion 44b of the cache resides in the memory controller 34. The tag portion 44a is managed by the CAM 29, which may include hardware components configured to implement a cache entry replacement policy such as a least recently used (LRU) policy. The tag portion of each entry in the cache references one of the last N queue descriptors used to perform an enqueue or dequeue operation. The queue descriptor's location in memory is stored as a CAM entry. The corresponding queue descriptor is stored in the data store portion 44b of the memory controller 34 at the address entered in the CAM. The actual data (e.g., included in memory addresses 38a–38c in FIG. 3) placed on the queue is stored in the second memory 32 and is referenced by the queue of buffer descriptors (e.g., 48a) located in the first memory 30.

The queue manager 27 may alternately service enqueue and dequeue requests. For single-buffer packets, an enqueue request references a tail pointer of an entry in the data store portion 44b. A dequeue request references a head pointer of an entry in the data store portion 44b. Because the cache includes valid updated queue descriptors, the need to lock access to a queue descriptor may be eliminated when near simultaneous enqueue and dequeue operations to the same queue are required. Therefore, the atomic accesses and latency that accompany locking may be avoided.

The data store portion 44b maintains a list of a certain number of the most recently used (MRU) queue descriptors 46. Each queue descriptor includes pointers to a corresponding MRU queue of buffer descriptors 48. In one implementation, the number of MRU queue descriptors 46 in the data store portion 44b is sixteen. Each MRU queue descriptor 46 is referenced by a set of pointers 45 residing in the tag portion 44a. In addition, each MRU queue descriptor 46 may be associated with a unique identifier so that it may be identified easily.

Referring to FIG. 3, the operation of the cache, is illustrated. The first entry in the tag portion 44a is associated with a pointer 45a that points to a MRU queue descriptor 46a residing in the data store portion 44b. The queue descriptor 46a is associated with a MRU queue of buffer descriptors 48a which are discussed in detail below. The queue descriptor 46a includes a head pointer 50a pointing to the first buffer descriptor A and a tail pointer 50b pointing to the last buffer descriptor C. An optional count field 50c maintains the number of buffer descriptors in the queue of buffer descriptors 48a. In this case the count field 50c is set to the value "3" representing the buffer descriptors A, B and C. As discussed in further detail below, the head pointer 50a, the tail pointer 50b and the count field 50c may be modified in response to enqueue requests and dequeue requests.

A buffer descriptor is a data structure that describes a buffer. A buffer descriptor may include an address field, a cell count field and an end of packet (EOP) bit. The address field includes the memory address of a data buffer. Because each data buffer may be further divided into cells, the cell count field includes information about a buffer's cell count. The EOP bit is set to signify that a buffer is the last buffer in a packet.

Referring back to FIG. 2, the present technique implements an implicit mapping 53 between the address of the buffer descriptors in the first memory 30, which may include static random access memory (SRAM), and the addresses of the data buffers in the second memory 32, which may include dynamic random access memory (DRAM). In this context, a queue is an ordered list of buffer descriptors describing data buffers that may be stored at discontinuous addresses.

As shown, for example, in FIG. 3, each buffer descriptor A, B in the queue 48a, except the last buffer descriptor in the queue, includes a buffer descriptor pointer 55a, 55b to the next buffer descriptor in the queue. The buffer descriptor pointer 55c of the last buffer descriptor C in the queue is NULL.

Referring again to FIG. 2, the uncached queue descriptors 50 are stored in the first memory 30 and are not currently referenced by the data store portion 44b. Each uncached queue descriptor 50 also may be associated with a unique identifier. In addition, each uncached queue descriptor 50 includes pointers 51 to a corresponding uncached queue of buffer descriptors 52. In turn, each uncached queue of buffer descriptors 52 includes pointers 57 to the corresponding data buffers included in memory addresses 38 residing in the second memory 32.

Each enqueue request includes an address 38 of the data buffer associated with the corresponding data packet. In addition, each enqueue or dequeue request includes an identifier specifying either an uncached queue descriptor 50 or a MRU queue descriptor 46 associated with the data buffer included in memory address 38.

Figure 4:
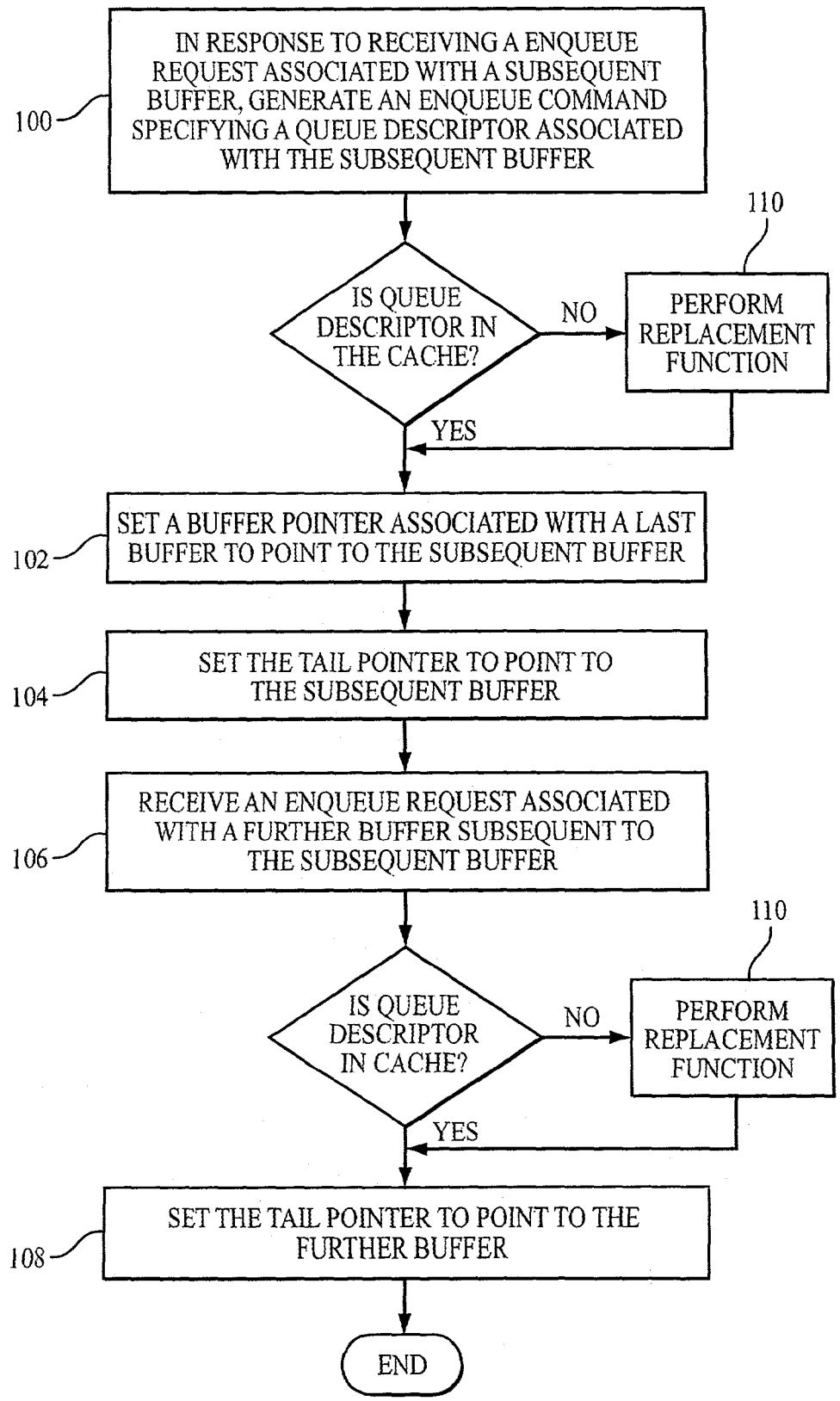
FIG. 4 is a flow chart that illustrates the flow of enqueue requests to a queue according to an implementation.
Figure 5:
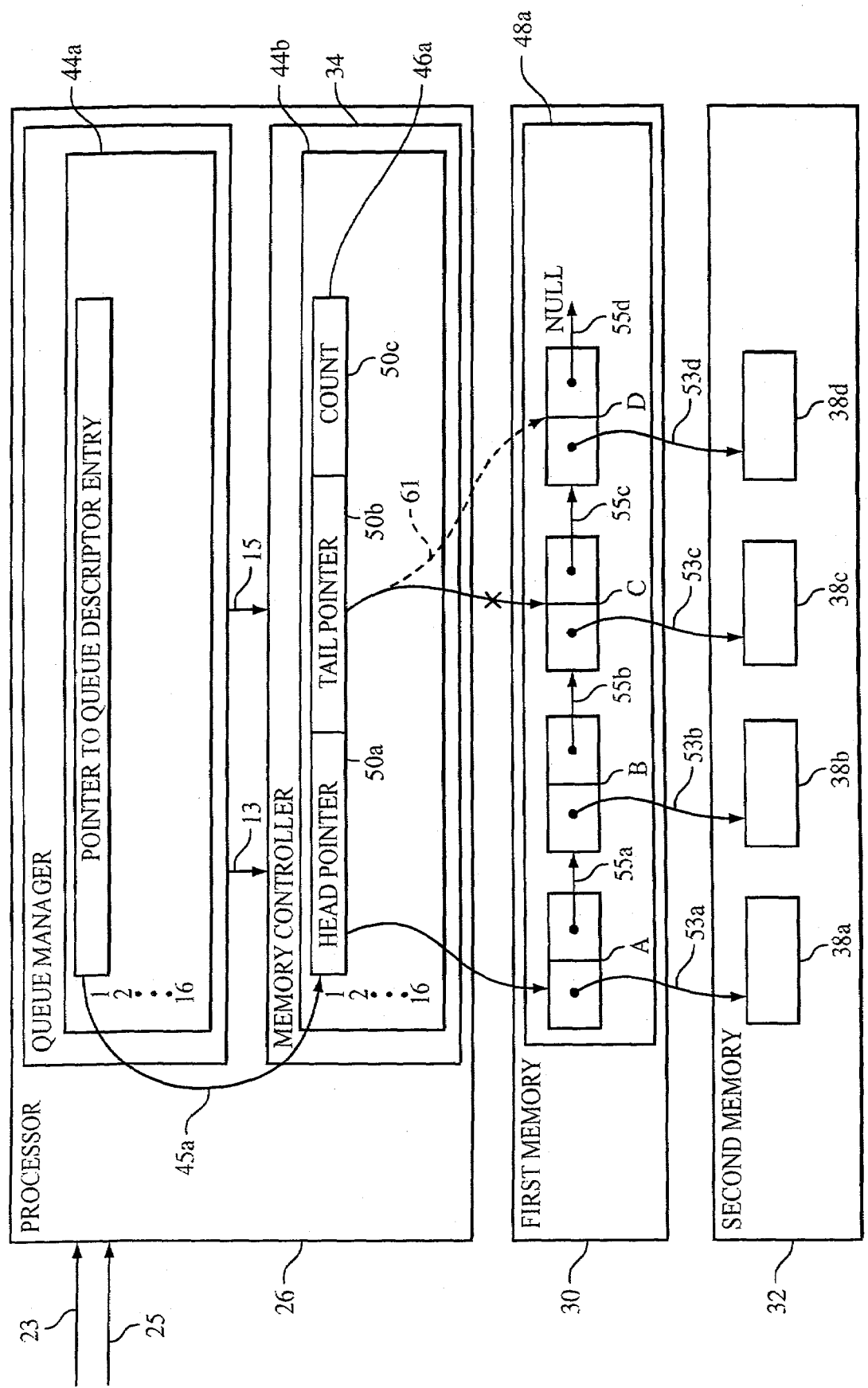
FIG. 5 is a block diagram that shows an enqueue operation according to an implementation.

Referring to FIGS. 4 and 5, in response to the receiving an enqueue request 23, the queue manager 27 generates 100 an enqueue command 13 directed to the memory controller 34. In the illustrated example, the enqueue request 23 is associated with a subsequent data buffer included in memory address 38d and received after the data buffer included in memory address 38c. The enqueue command 13 may include information specifying a MRU queue descriptor 46 residing in the data store portion 44b. It is assumed that the enqueue request 23 includes information specifying the queue descriptor 46a and an address 38d associated with a data buffer. The tail pointer 50b currently pointing to buffer descriptor C in the queue 48a is returned to the queue manager 27. The enqueue request 23 is evaluated to determine whether the specified queue descriptor is currently in the data store portion 44b. If it is not, then a replacement task is performed 110. The replacement task is discussed further below.

The buffer descriptor pointer 55c associated with buffer descriptor C is changed from a NULL value and is set 102 to point to the subsequent buffer descriptor D. That is accomplished by setting the buffer descriptor pointer 55c to the address of the buffer descriptor D. The buffer descriptor D points to the data buffer in memory address 38d that stores the received data packet, as indicated by line 53d.

Once the buffer descriptor pointer 55c has been set, the tail pointer 50b is set 104 to point to buffer descriptor D as indicated by dashed line 61. That is accomplished by setting the tail pointer 50b to the address of the buffer descriptor D. Since buffer descriptor D is now the last buffer descriptor in the queue 48a, the value of the buffer descriptor pointer 55d is NULL. Moreover, the value in the count field 50c is updated to "4" to reflect the number of buffer descriptors in the queue 48a. As a result, the buffer descriptor D is added to the queue 48a by using the queue descriptor 46a residing in the data store portion 44b.

If the enqueue command 13 includes a queue identifier specifying a queue descriptor which is not among the MRU queue descriptors 46, the queue manager 27 replaces a particular MRU queue descriptor 46 with the specified queue descriptor. As a result, the specified queue descriptor and the corresponding uncached queue of buffer descriptors are referenced by the data store portion 44b. In addition, for an enqueue command, the newly referenced queue of buffer descriptors 52 associated with the specified queue descriptor is updated to point to the memory address of the particular data buffer included in memory address 38 storing the received data packet. The MRU queue descriptor 46 may be updated quickly and efficiently because the queue descriptor is already in the data store portion 44b.

Figure 6:
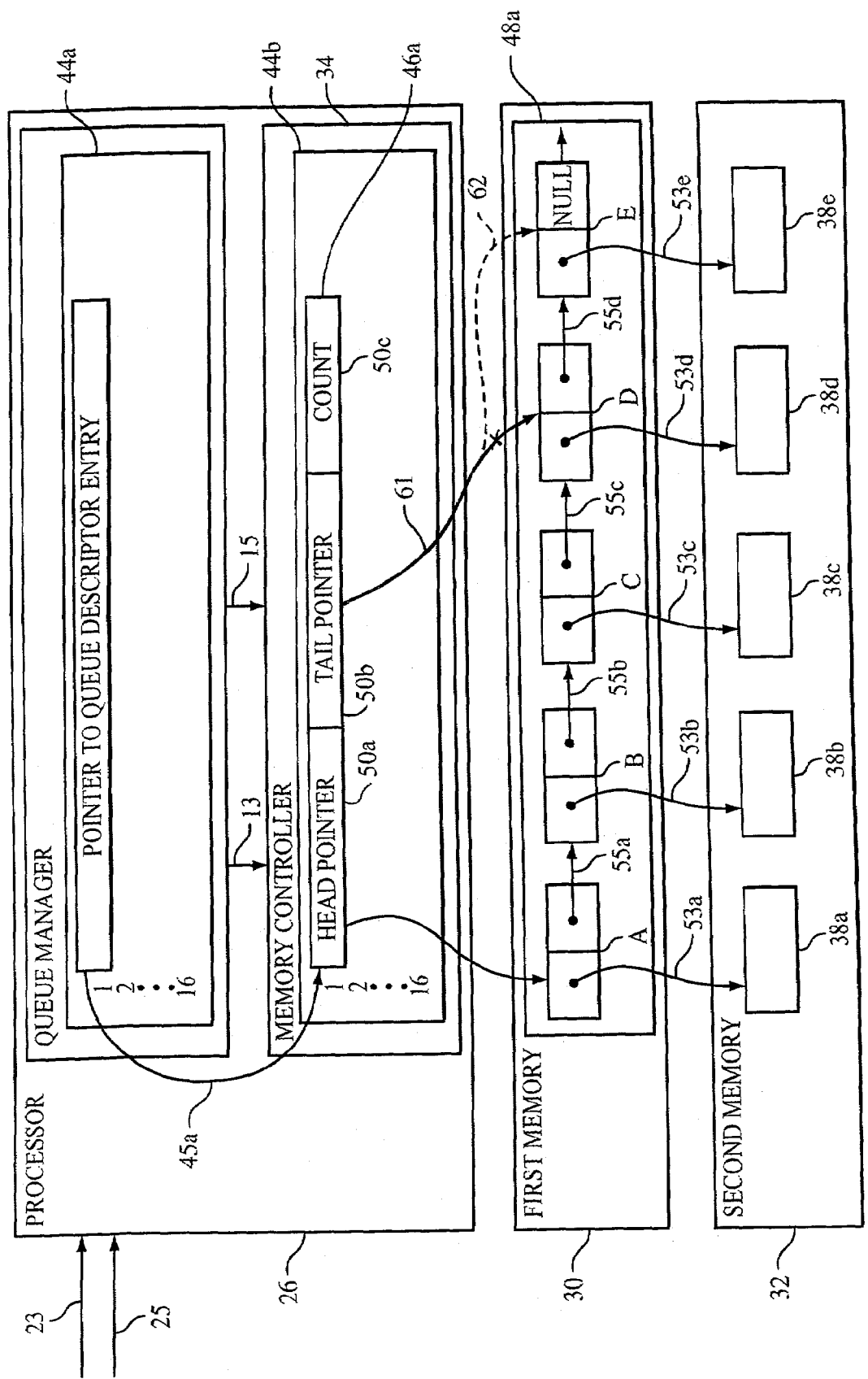
FIG. 6 is a block diagram that shows an enqueue operation subsequent to an enqueue operation to a queue according to an implementation.

Referring to FIG. 6, the processor 18 may receive 106 a subsequent enqueue request associated with the same queue descriptor 46a and queue 48a. For example, it is assumed that the queue manager 27 receives a subsequent enqueue request associated with a newly arrived data buffer 38e. It also is assumed that the data buffer included in memory address 38e is associated with the queue descriptor 46a. The tail pointer 50b may be set to point to buffer E as indicated by the dashed line 62. The tail pointer 50b is updated without having to retrieve it from memory because it is already in the data store portion 44b. As a result, the latency of back-to-back enqueue operations to the same queue of buffers may be reduced. Hence, the queue manager may manage requests to a large number of queues as well as successive requests to only a few queues or to a single queue. Additionally, the queue manager 27 issues commands indicating to the memory controller 34 which of the multiple data store portion entries to use to perform the command.

Figure 7:
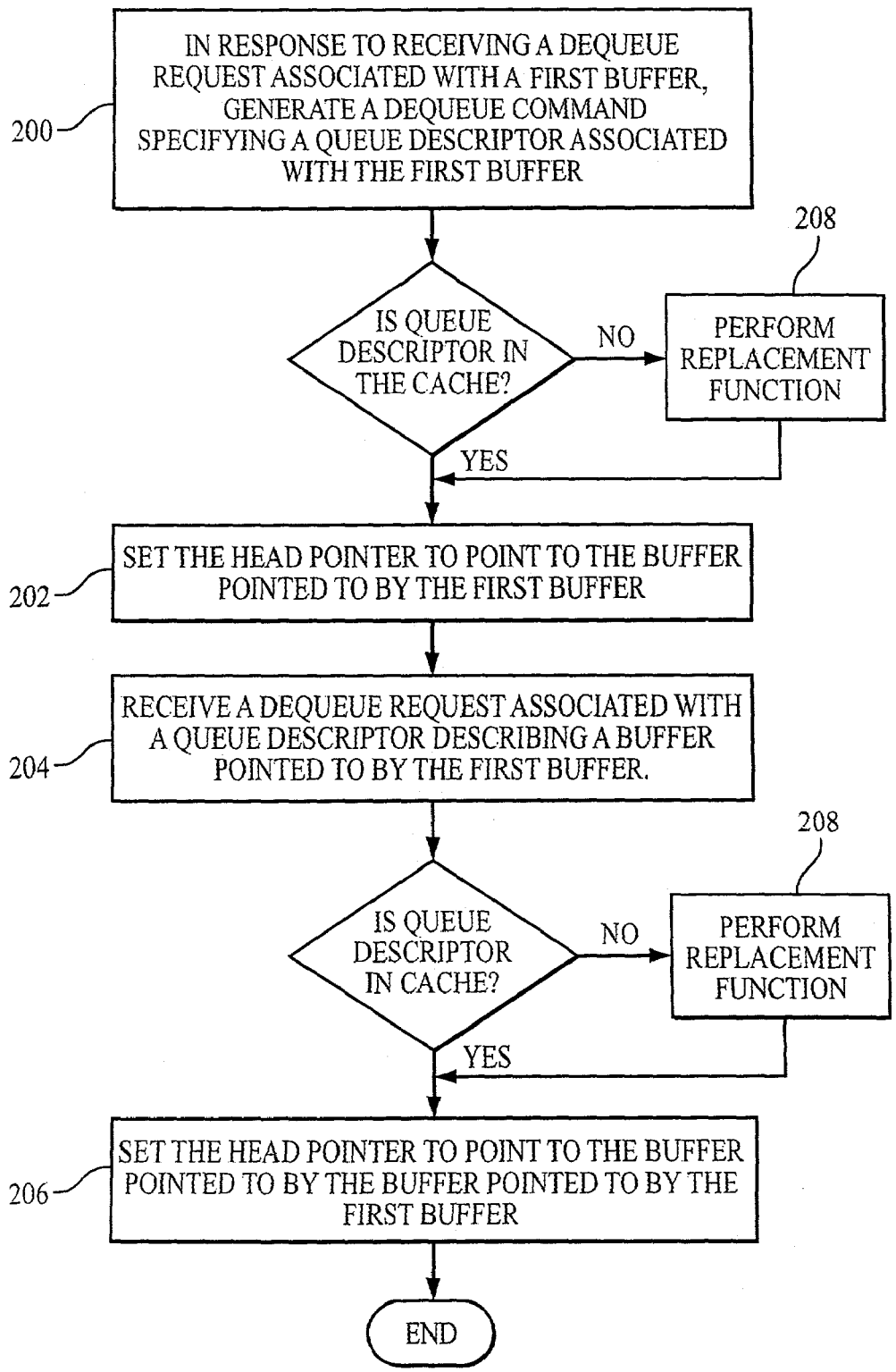
FIG. 7 is a flow chart that illustrates the flow of dequeue requests to a queue according to an implementation.
Figure 8:
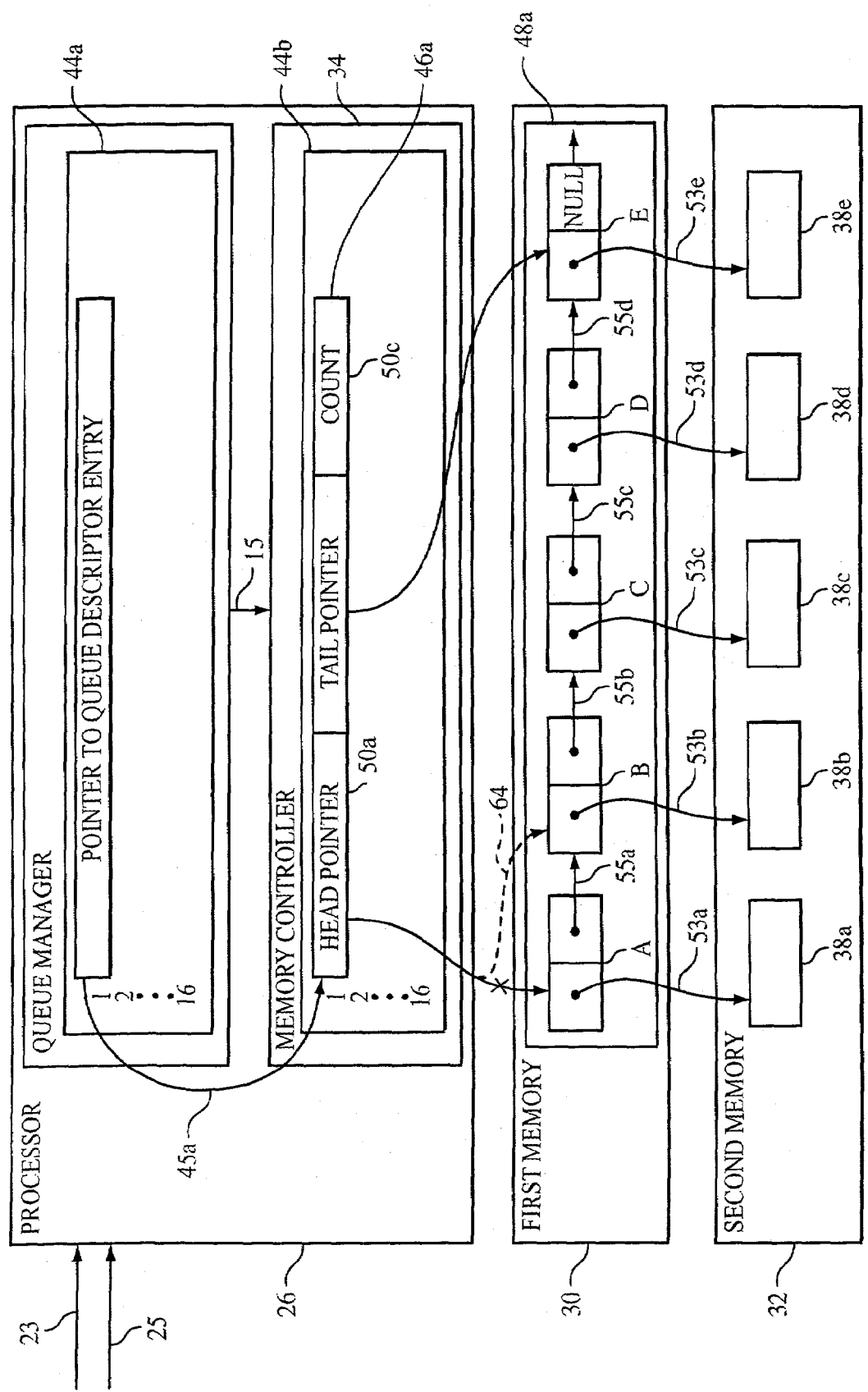
FIG. 8 is a block diagram that shows a dequeue operation according to an implementation.

Referring to FIGS. 7 and 8, in response to receiving 200 a dequeue request 25, the queue manager 27 generates 200 a dequeue command 15 directed to the memory controller 34. In this example, the dequeue request is associated with the queue descriptor 46a and represents a request to retrieve a data buffer from the second memory 32. Once the data buffer is retrieved, it may be transmitted from the second memory 32 to the transmit buffer 36. The dequeue request 25 includes information specifying the queue descriptor 46a. The head pointer 50a of the queue descriptor 46a points, for example, to the first buffer descriptor A which, in turn, points to the data buffer in memory address 38a. As a result, the data buffer in memory address 38a is returned to the queue manager 27.

The head pointer 50a is set 202 to point to the next buffer descriptor B in the queue 48a as indicated by the dashed line 64. That may be accomplished by setting the head pointer 50a to the address of buffer B descriptor. The value in the count field 50c is updated to "4", reflecting the remaining number of buffer descriptors (B through E). As a result, the data buffer included in memory address 38a is retrieved from the queue 48a by using the queue descriptor 46a residing in the data store portion 44b.

Figure 9:
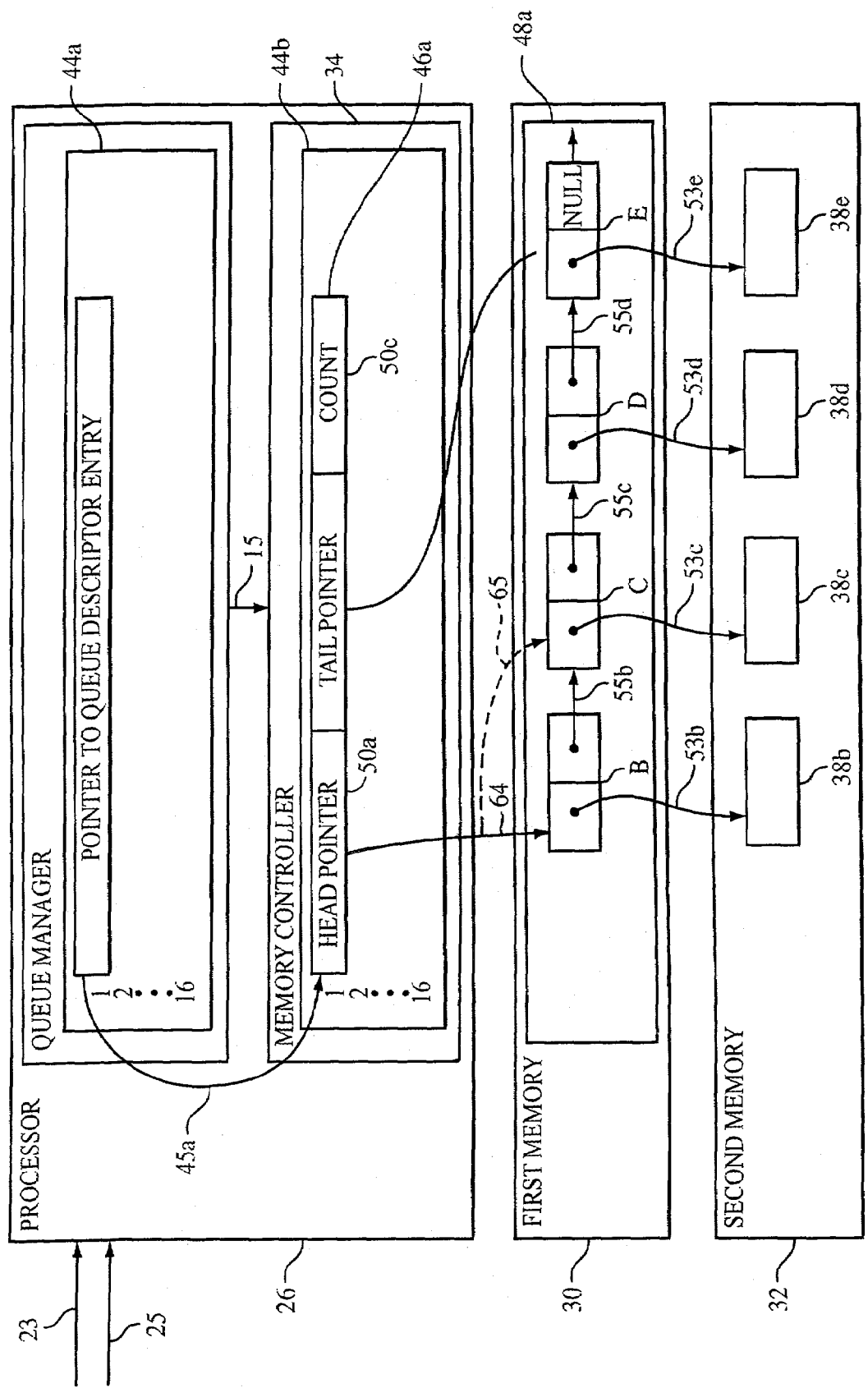
FIG. 9 is a block diagram that shows a dequeue operation subsequent to a dequeue operation to a queue according to an implementation.

The queue manager 27 may receive 204 subsequent dequeue requests 25 associated with the same queue descriptor. It is assumed, for example, that the queue manager 27 receives a further dequeue request 25 associated with the queue descriptor 46a. Referring to FIG. 9, as indicated by the line 64, the head pointer 46a currently points to buffer B which is now the first buffer because the reference to buffer A previously was removed. The head pointer 50a may be set 206 to point to buffer C, as indicated by a dashed line 65, without first having to retrieve the head pointer 50a from memory because it is already in the data store portion 44b. As a result, the latency of back-to-back dequeue operations to the same queue of buffers may be reduced.

In some situations, however, the queue descriptor 46a currently occupying an entry of the data store portion 44b is not associated with the data buffer in memory address 38b. In that case, the processor 18 performs 208 a replacement task similar to the one discussed above. Once the replacement task has been completed, operations associated with the dequeue request are performed as discussed above.

The cache of queue descriptors may be implemented in a distributed manner such that the tag portion 44a resides in the memory controller 34 and the data store portion 44b resides in the first memory 30. Data buffers included in memory addresses 38 that are received from the receive buffer 20 may be processed quickly. For example, the second of a pair of dequeue commands may be started once the head pointer for that queue descriptor is updated as a result of the first dequeue memory read of the head pointer. Similarly, the second of a pair of enqueue commands may be started once the tail pointer for that queue descriptor is updated as a result of the first enqueue memory read of the tail pointer. In addition, using a queue of buffers, such as a linked list of buffers, allows for a flexible approach to processing a large number of queues. Data buffers may be quickly enqueued to the queue of buffers and dequeued from the queue of buffers.

Entries of the data store portion 44b of the cache which are not used to store information describing the structure of a queue of data buffers may be used to store (1) information describing the structure of a free list as non-cached or permanently-resident entries; (2) information describing the structure of a memory ring as non-cached or permanently-resident entries, (3) information describing the structure of a journal as permanently resident entries or (4) any combination of these uses. Permanently-resident entries are entries that will not be removed to make space for new entries.

A free list functions as a pool of currently unused buffers. Free lists may be used for buffer storage by systems that dynamically allocate memory. Such systems allocate available free storage from a free list for newly received data. An entry is taken from the pool as needed when a packet or cell is received. An entry is returned to the pool when the packet or cell is transmitted or discarded. When a free list is implemented using a linked list data structure, a new buffer may be taken from the front of the queue of currently unused buffers using the dequeue command. Similarly, a buffer whose usage is terminated may be added to the end of the queue of currently unused buffers using the enqueue command.

Alternatively, when a free list is implemented using a stack data structure, a new buffer may be removed for newly received data from the stack using a pop command. A buffer whose usage may be terminated may be added to the stack using a push command. Because a stack is a last-in, first-out (LIFO) data structure, buffers are removed in the reverse order from that in which they are added to the stack. The buffer most recently added to the stack is the first buffer removed.

Figure 10:
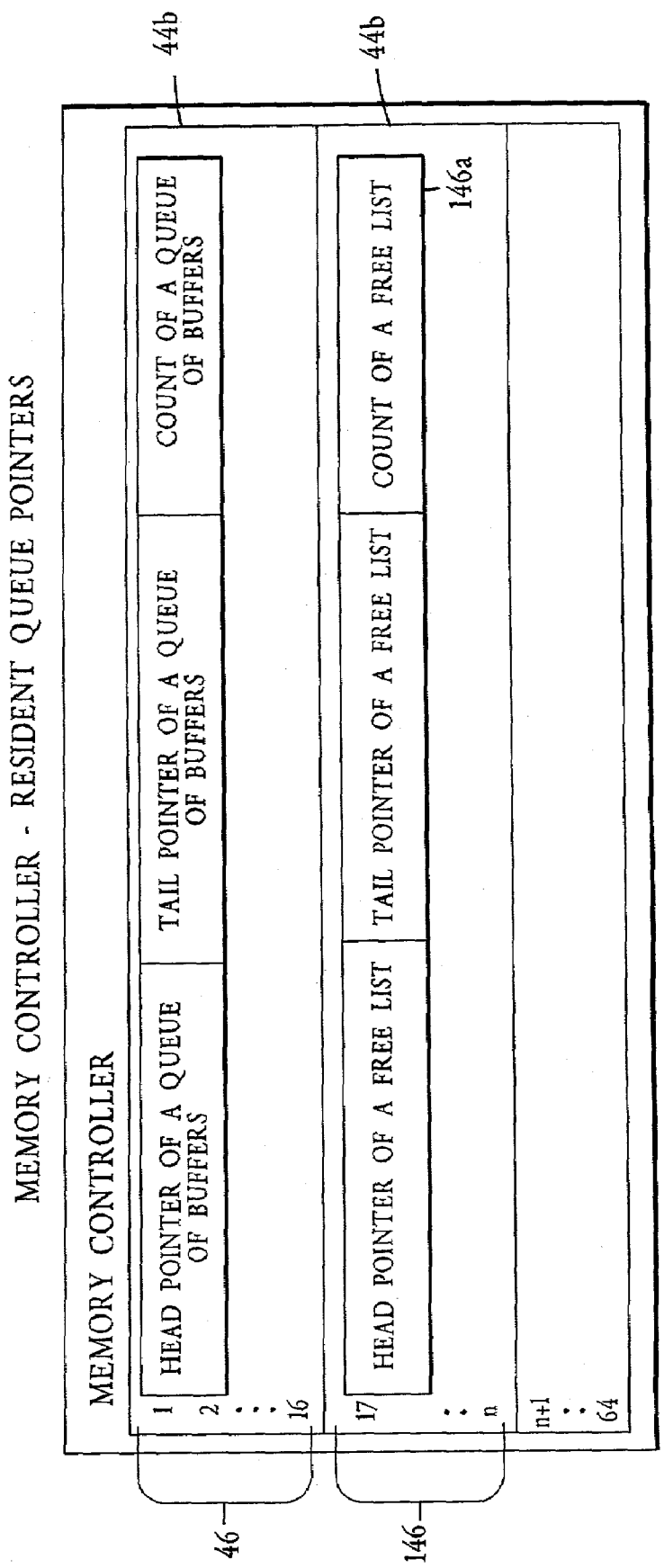
FIG. 10 is a block diagram of a cache data structure that includes memory controller-resident pointers of a free list according to an implementation.

As shown in FIG. 10, a number of entries 146 of the data store portion 44b of the cache that are not used to store the MRU queue descriptors 46 may be used to store queue descriptors 146a describing the structure of one or more free lists. In one implementation, the number of queue descriptors 46 describing data buffers in the data store portion is sixteen, and the total number of entries in the data store portion 44b of the cache is sixty-four.

The entries 146 of the data store portion used to store queue descriptors describing a structure of a free list may be non-cached or permanently resident entries. Therefore, for each queue descriptor describing a structure of a free list desired to be stored, the fetch replacement task may be performed only once at system initialization to load them into a subset 146 of the entries of the data store portion of the queue.

When the data contained in a buffer has been transmitted, the present usage of the buffer is terminated and the buffer is returned to the free list to replenish the pool of currently unused buffers. A processing engine thread, such as a thread providing a queue manager 27, may generate an enqueue command directed to the memory controller that references a free list entry 146.

Figure 11:
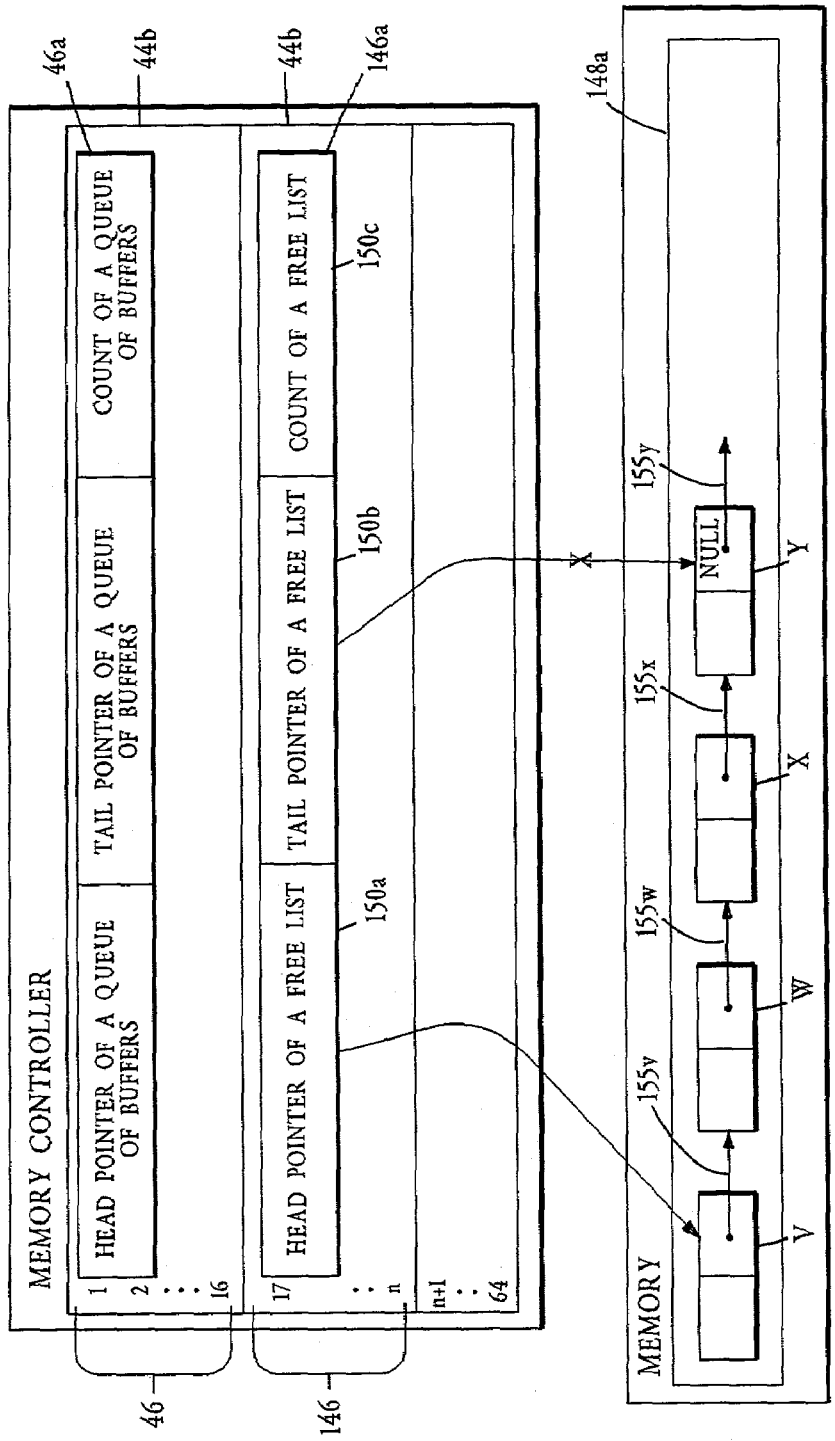
FIG. 11 is a block diagram of a cache data structure that includes memory controller-resident pointers of a free list prior to an enqueue operation according to an implementation.

Referring to FIG. 11, the operation of the cache is illustrated. In this example, a queue descriptor 146a describing the structure of a free list 148a includes a head pointer 150a pointing to the first buffer V in the free list, a tail pointer 150b pointing to the last buffer Y in the free list, and a count field 150c that maintains the number of buffers in the free list 148a. In this case, the count field 150c is set to the value "4" representing buffers V, W, X and Y. As discussed in further detail below, the head pointer 150a, the tail pointer 150b and the count field 150c may be modified in response to enqueue and dequeue commands that are associated with a free list.

Each buffer in the free list 148a, such as a first buffer V, contains a buffer pointer 155v that points to a next ordered buffer W. The buffer pointer 155y associated with the last buffer Y has a value set to NULL to indicate that it is the last buffer in the queue 148a.

Figure 12:
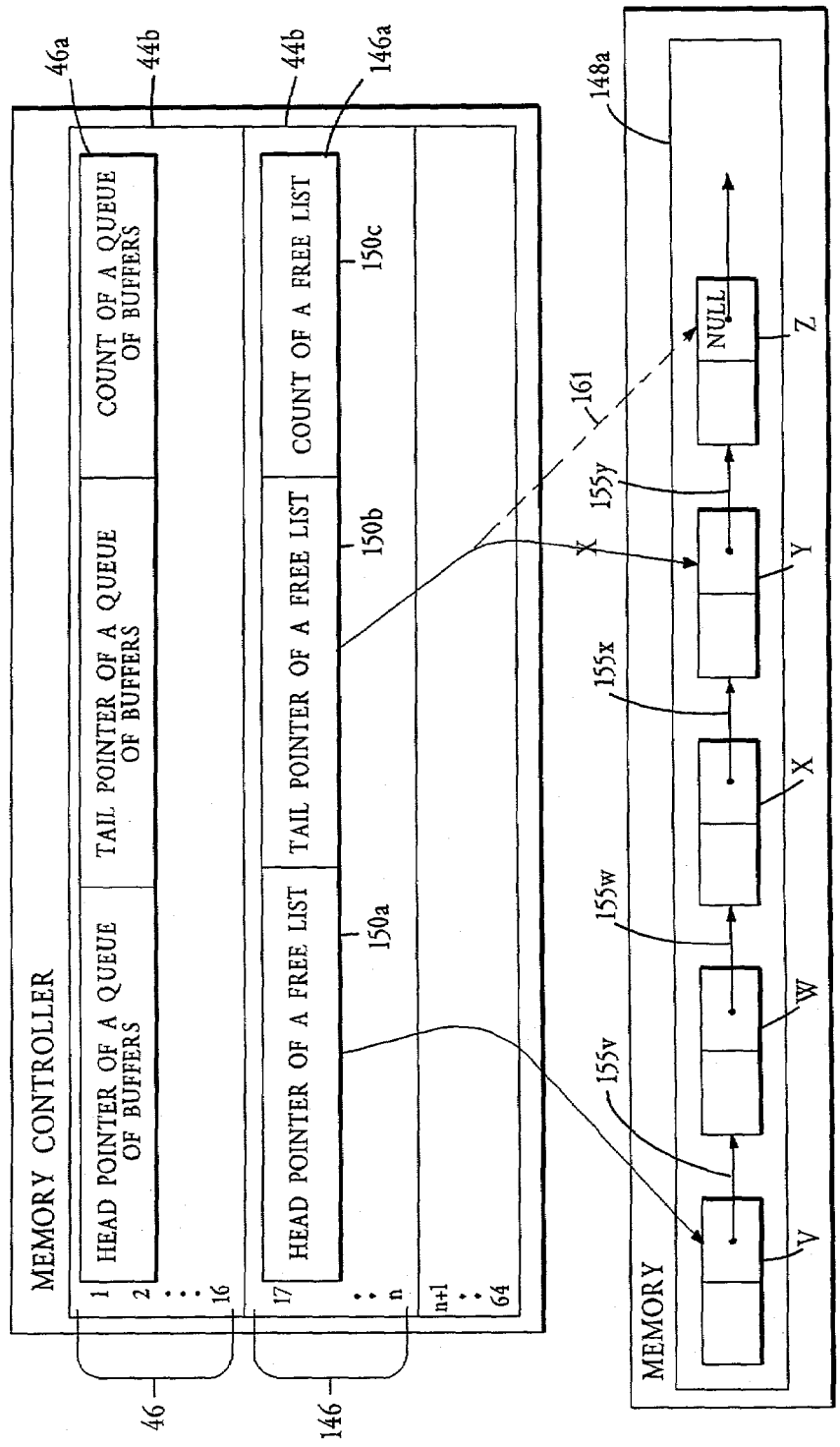
FIG. 12 is a block diagram that shows an enqueue operation to a free list according to an implementation.

In the example illustrated in FIG. 12, the tail pointer 150b currently pointing to buffer Y is returned to the queue manager 27. The buffer pointer 155y associated with buffer Y currently contains a NULL value indicating that it is the last buffer in the free list 148a. The buffer pointer 155y is set to point to the subsequent buffer Z, which is a buffer whose usage was just terminated. That may be accomplished by setting the buffer pointer 155y to the address of the buffer Z.

Once the buffer pointer 155y has been set, the tail pointer 150b is set to point to buffer Z as indicated by dashed line 161. This may be accomplished by setting the tail pointer 150b to the address of the buffer Z. Moreover, the value in the count field 150c is updated to "5" to reflect the number of buffers in the free list 148a. As a result, the buffer Z is added to the free list 148a by using the queue descriptor 146a residing in the data store portion 44b.

When a store and forward processor receives a new data packet, the system allocates a buffer from the free list.

Figure 13:
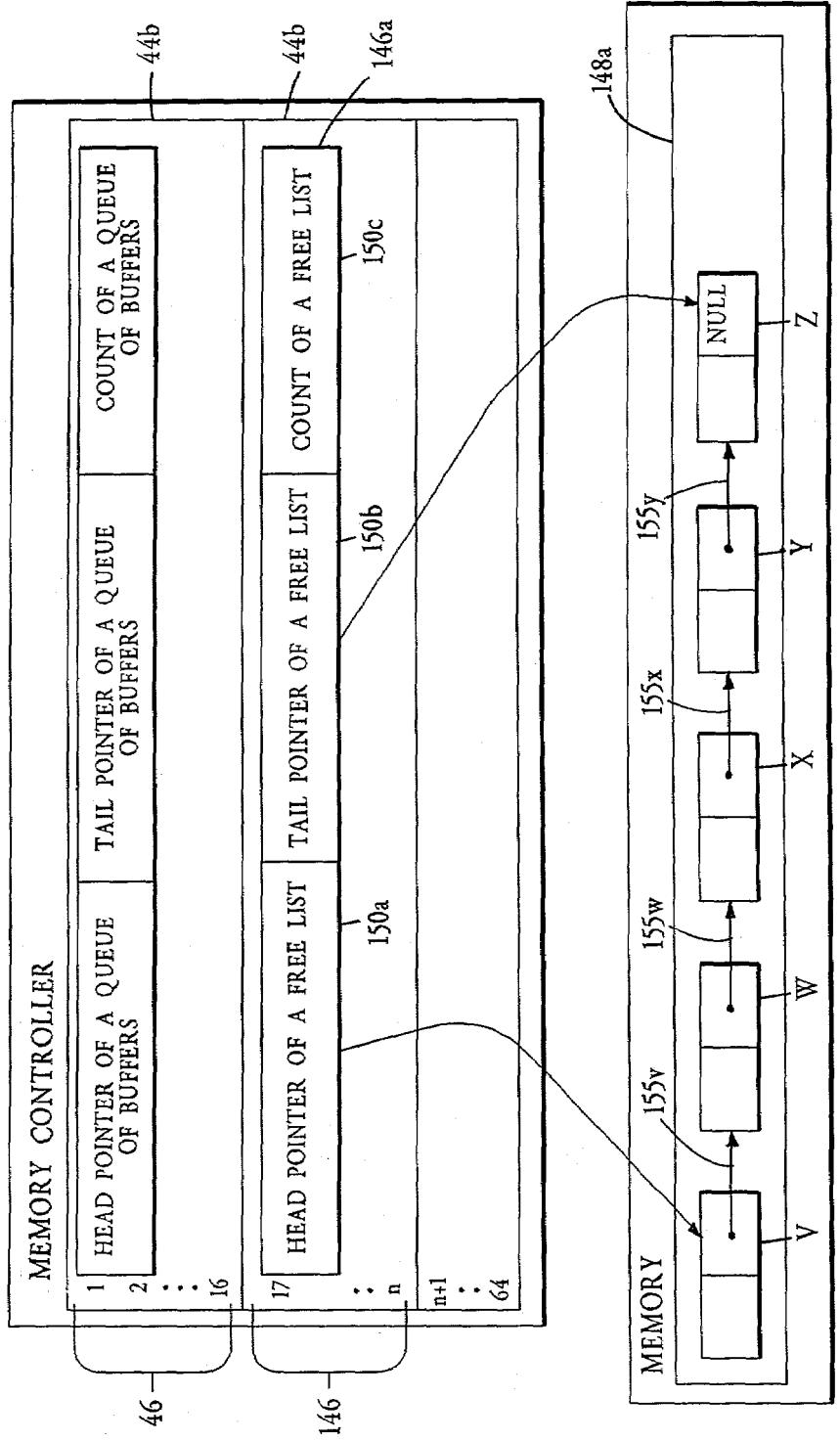
FIG. 13 is a block diagram of a cache data structure that includes memory controller-resident pointers of a free list prior to a dequeue operation according to an implementation.

Referring to FIG. 13, the operation of the cache is illustrated. In this example, a processing engine thread, such as a thread providing the queue manager 27, may generate a dequeue command directed to the memory controller 34 that references a free list entry. The dequeue request is associated with the information describing a structure of the free list 146a and represents a request to retrieve an unused buffer from the memory. Once the unused buffer is retrieved, it may be transmitted from the memory to the receive buffer. The dequeue request 25 includes information specifying the structure of the free list 146a. The head pointer 150a of the information describing the structure of the free list 146a points to the first buffer V in the free list. As a result, unused buffer V is returned to the queue manager.

Figure 14:
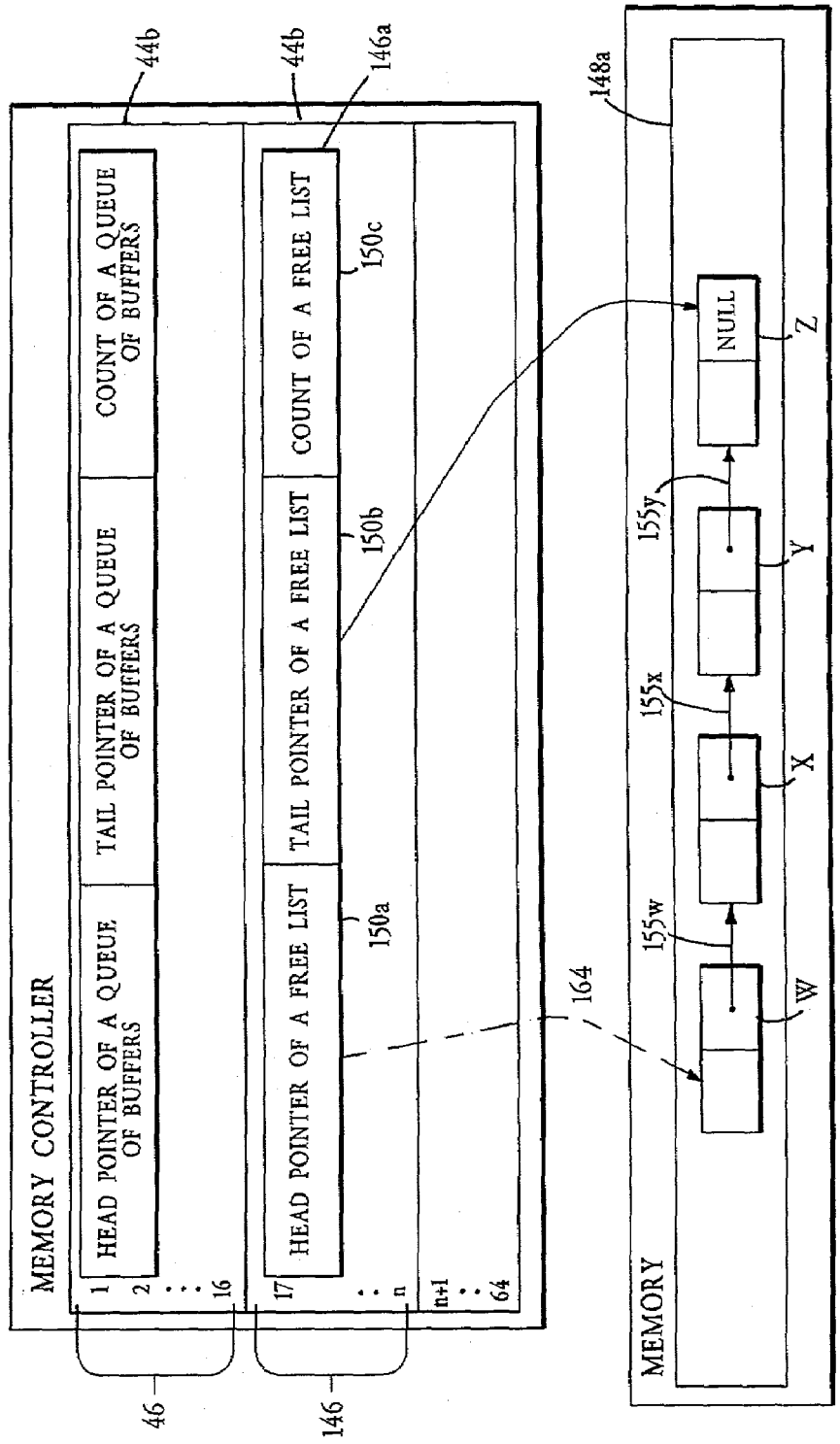
FIG. 14 is a block diagram that shows a dequeue operation to a free list according to an implementation.

Referring to FIG. 14, the head pointer 150a is set to point to the next buffer W in the free list 148a as indicated by the dashed line 164. That may be accomplished by setting the head pointer 150a to the address of buffer W. The value in the count field 150c is updated to "4", reflecting the remaining number of buffers (W through Z). As a result, unused buffer V is retrieved from the free list 148a by using information describing the structure of a free list 146a residing in the data store portion 44b and may be used by the processor to store newly received packets or cells.

As discussed above, enqueue operations that reference information describing the structure of a free list in the cache are used to return buffers to that free list. Dequeue operations that reference information describing the structure of a free list in the cache are used to remove buffers from that free list. Using the present technique, the processor may manage a large number of free lists in an efficient and low cost manner by using hardware (e.g., a memory controller, CAM) already present to perform other tasks.

Entries of the data store portion 44b of the cache which are not used to store information describing the structure of a queue of data buffers also may be used to manage a ring data structure. Because a ring data structure includes a block of contiguous memory addresses that is of a predefined size and location, it may be used for static memory allocation.

Figure 15:
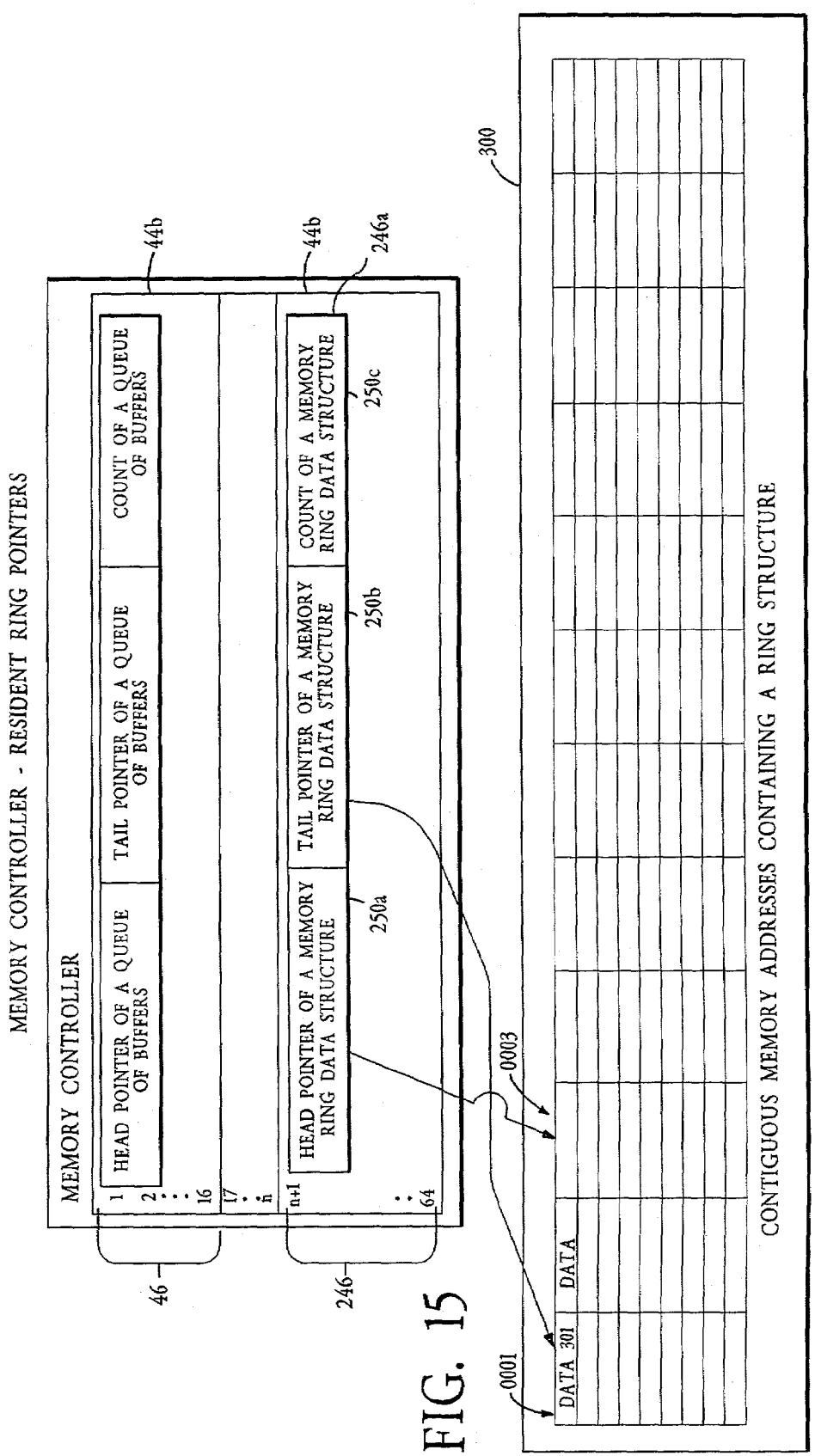
FIG. 15 is a block diagram of a cache data structure that includes memory controller-resident pointers of a memory ring data structure according to an implementation.

Referring to FIG. 15, a technique defines and implements commands that use entries 246 of the data store portion 44b of the cache to store information describing a structure of a ring 300. The information 246a describing a structure of a ring includes a head pointer 250a which tracks the memory location 0003 where data is to be inserted, a tail pointer 250b which tracks the memory location 0001 where data 301 is to be removed, and an optional count field 250c which tracks the number of entries in the ring 300. The entries 246 of the data store portion used to store information describing the structure of a ring may be non-cached or permanently resident entries. Because the ring data structure has a fixed size, whenever either pointer 250a, 250b points to the address at the end of the ring, it wraps back to the address at the start of the ring.

A context of a programming engine may issue a put command to cause data to be written to a ring data structure. The put command specifies a length field and a head pointer, where the length field is specified as a number of words.

Figure 16:
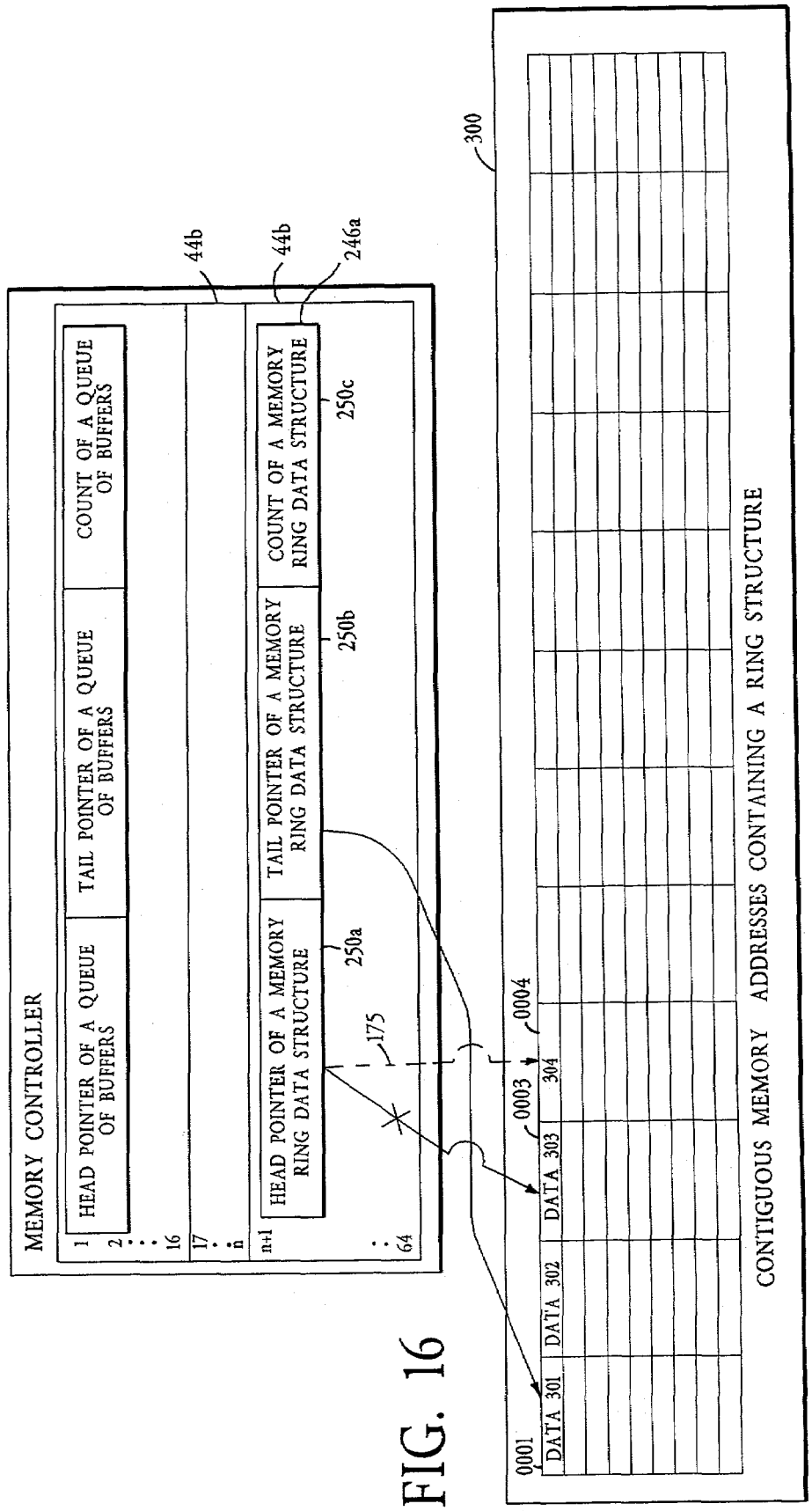
FIG. 16 is a block diagram that illustrates a put command operation according to an implementation.

Referring to FIG. 16, a data word 303 is written to a ring at the address 0003 indicated by the head pointer 250a. Once the data word has been written to the address 0003, the head pointer 250a is set to point to the next memory location 0004 as indicated by dashed line 175. That is accomplished by setting the head pointer 250a to the memory address 0004. Moreover, the value of the count field 250c is updated to "3" to reflect the number of data words in the ring 300. Additionally, the count field and a status bit indicating whether there was sufficient memory available to write the specified length of words to the ring are returned to the programming engine context that issued the put command. As a result, data is written to the ring 300 by using information describing the structure of the ring 246a residing in the data store portion 44b.

A context of a programming engine may issue a get command to cause data to be read from a ring data structure. The get command specifies a length field and a tail pointer, where the length field is specified as a number of words.

Figure 17:
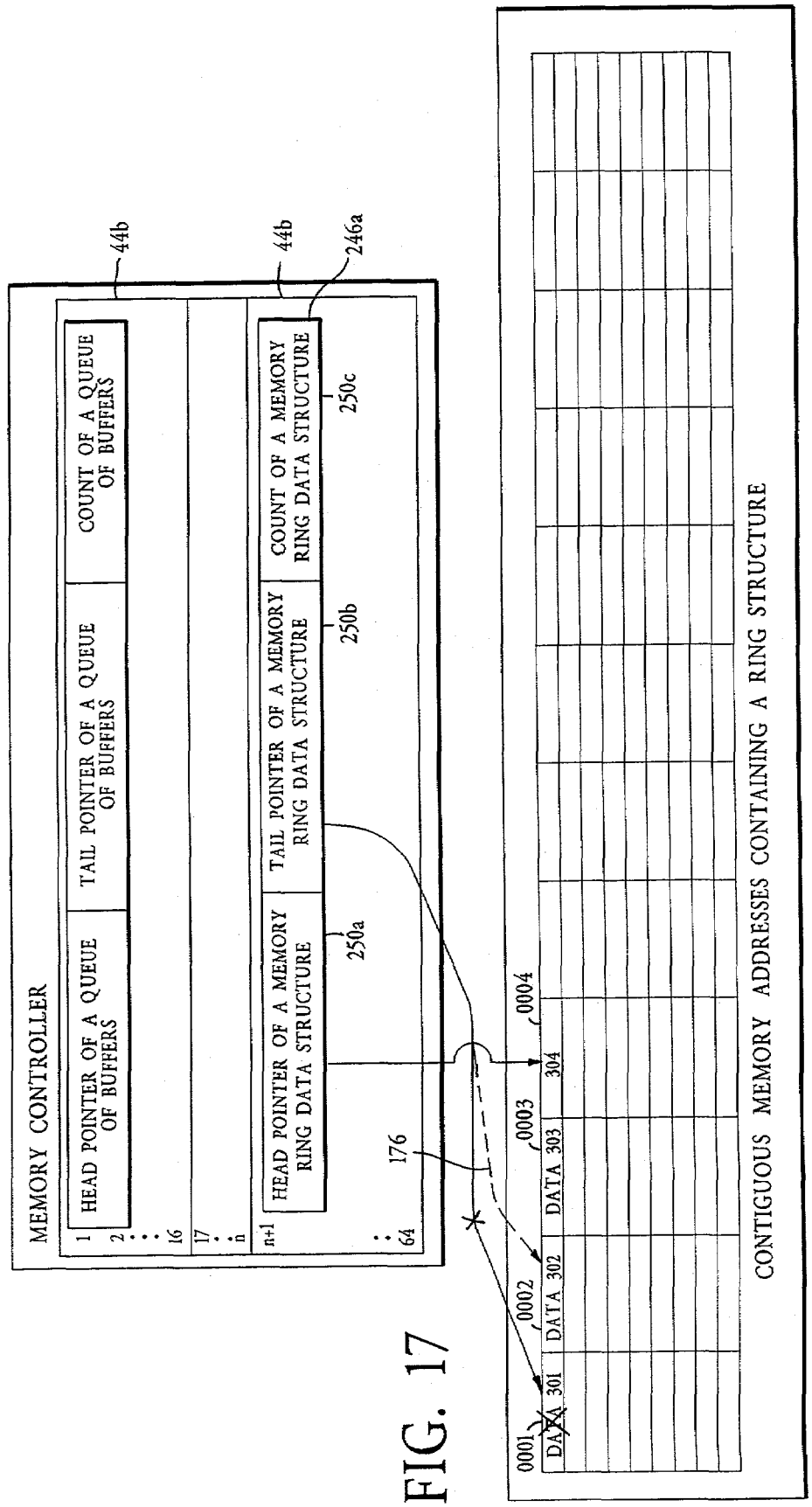
FIG. 17 is a block diagram that illustrates a get command operation according to an implementation.

Referring to FIG. 17, a data word 301 is read from a ring at the memory address 0001 indicated by the tail pointer 250b. Once the data word has been read, the tail pointer 250b is set to point to memory location 0002 as indicated by dashed line 176. That is accomplished by setting the tail pointer 250b to the memory address 0002. Moreover, the value of the count field 250c is updated to "2" to reflect the number of data words in the ring 300. As a result, data is removed from the ring 300 by using information describing the structure of the ring 246a residing in the data store portion 44b. If the count field 250c is less than the length field specified in the get command, an identifier, such as a zero data word, indicating the ring 300 is empty is returned to the programming engine context that issued the get command and no data is removed from the ring.

Because a network processor may include multiple programming engines each of which may execute multiple threads or contexts, observing how code is executing on any individual programming engine thread and tracking the progress of different programming engine threads with respect to one another may be useful to help debug applications running on the network processor.

The present technique defines and implements a set of journaling commands that provide a way to observe how code is executing during system operation. The technique uses entries of the data store portion 44b of the cache that are not used to store information describing the structure of a queue of data buffers. These entries are used to manage a ring data structure implemented as a journal. Each of these entries includes information describing a structure of a ring. As discussed earlier in connection with FIGS. 15–17, the information 246a describing the structure of the ring includes a head pointer 250a which tracks the location where data is to be inserted, a tail pointer 250b which tracks the location where data is to be removed, and an optional count field 250c which tracks the number of journal entries made. Because data is inserted into the journal but no data is removed from the journal during program execution, the tail pointer 250b is more meaningful than the head pointer 250a for this purpose. The entries used to support the journal commands may be permanently resident in the data store portion.

Although an executing program may generate messages that provide useful information about the state of an executing context when predetermined locations of the program are reached, the number of instructions used to support a journal should be minimal. Otherwise, the system resources used to support the journal may interfere with the system's real-time programming needs. Hence, the amount of information in the journal should be balanced against the number of instructions and cycles necessary to provide this information.

A context of a programming engine may issue a journal command. The journal command is defined to move a number of words specified by the length field from a memory register to the journal, where each word may include thirty-two bits of journaling information. The journal command may be used to store a number of words from a memory register to the journal when predetermined checkpoints in a program are reached.

The journal_tag command is defined to move a number of words specified by the length field from a memory register to the journal. Each word includes thirty-two bits of journaling information, comprising four bits of programming engine identification, three bits of thread identification and twenty-five bits of journaling information. Hence, the journal_tag command may include the data information provided by the journal command and also may include information about which programming engine and which context of that programming engine issued the journal_tag command.

The fast_journal command is defined to move the command address field from a memory register to the journal. Because all commands have an address field, the fast_journal command provides information about which command or checkpoint was reached in the program that is being debugged.

The fast_journal_tag command is defined to move the command address field from a memory register to the journal, where each word may include four bits of programming engine identification, three bits of context identification, and twenty-five bits of command address to indicate what command was issued. Therefore, the fast_journal_tag command may include the data information provided by the fast_journal command and also may include information about which programming engine and which context of that programming engine issued the command.

The present technique can provide a method of implementing elaborate tracking systems in an efficient and low cost manner by using hardware already present for performing other tasks. One implementation includes sixteen programming engines with eight contexts each. The implementation also includes sixty-four data store portion entries per SRAM channel, sixteen of which are used to store information describing the structure of a queue of data buffers. Because as many as forty-eight data store portion entries may be available per SRAM channel to store information describing the structure of a journal, the present technique may support multiple journals. Other implementations may differ in some respects.

After writing to all memory locations of a journal that implements a ring data structure, the tail pointer wraps around to the start address of the journal to continue writing data. If the ring data structure is completely written, subsequent journal write operations will overwrite the data previously written. Only the most recent data will be present in the ring. The put command, discussed earlier, returns a ring full notification to the programming engine context that issued the put command, using a status bit to indicate there is insufficient memory available to write the specified length of words to the ring. In contrast, all journal commands are completed because there is no need to wait if the insert pointer exceeds the remove pointer.

Various features of the system may be implemented in hardware, software, or a combination of hardware and software. For example, some aspects of the system may be implemented in storage media, having instructions stored thereon, executed by a machine or in computer programs executing on programmable computers or processors. Each program may be implemented in a high level procedural or object-oriented programming language to communicate with a computer system. Furthermore, each such computer program may be stored on a storage medium, such as read-only-memory (ROM) readable by a general or special purpose programmable computer, for configuring and operating the computer when the storage medium is read by the computer to perform the tasks described above.

Other implementations are within the scope of the following claims.

What is claimed is:

1. A method comprising:
   checking a content addressable memory for a tag corresponding to a queue of data buffers associated with a dequeue request;
   accessing a queue descriptor, for the queue of data buffers, in a cache memory based on a result of the checking;
   removing a data buffer from the queue of data buffers using the queue descriptor from the cache memory;
   processing information in the removed data buffer; and
   appending the data buffer to a queue of currently unused buffers in response to an enqueue request.

2. The method of claim 1 further comprising storing currently unused buffers using a linked list data structure.

3. The method of claim 1 further comprising storing currently unused buffers using a stack data structure.

4. The method of claim 1 wherein the data buffer comprises a network packet and wherein the network packet comprises a packet received in a network processor.

5. The method of claim 1 further comprising modifying information describing a structure of the queue of currently unused buffers.

6. The method of claim 5 wherein said removing is performed in response to receiving a data packet in a receive pipeline and appending and modifying are performed in response to receiving the enqueue request.

7. A method comprising:
   removing a currently unused buffer from a queue of currently unused buffers in response to a dequeue request;
   processing a newly received data packet;
   storing the newly received data packet in the removed buffer;
   checking a content addressable memory for a tag corresponding to a queue of data buffers associated with an enqueue request;
   accessing a queue descriptor, for the queue of data buffers, in a cache memory based on a result of the checking;
   appending the removed buffer to the queue of data buffers using the queue descriptor from the cache memory.

8. The method of claim 7 further comprising storing currently unused buffers using a linked list data structure.

9. The method of claim 7 further comprising storing currently unused buffers using a stack data structure.

10. The method of claim 7 wherein the data buffer comprises a network packet and wherein the network packet comprises a packet received in a network processor.

11. The method of claim 7 further comprising modifying information describing a structure of the queue of currently unused buffers.

12. The method of claim 11 wherein said removing is performed in response to receiving a data packet in the receive pipeline and storing and modifying are performed in response to receiving the dequeue request.

13. A method comprising:
    receiving a request to write data to a memory ring data structure; and
    issuing a command, in response to the request, the command specifying a pointer to a memory location in which the data is to be inserted, said pointer describing a structure of the memory ring;
    writing data to a memory ring address identified by the information describing a structure of the memory ring;
    incrementing a pointer to a memory location in which data is to be inserted, said pointer describing a structure of the memory ring;
    incrementing the number of entries in the ring, said number of entries describing a structure of the memory ring; and
    storing the modified pointer and number of entries which describe a structure of the memory ring in a cache memory having entries to store information describing a structure of a queue of data buffers or a structure of a queue of currently unused buffers.

14. The method of claim 13 wherein the command specifies a length field and wherein the number of entries in the ring is incremented by the specified length field.

15. The method of claim 13 further comprising:
    returning to an issuing programming engine thread, in response to the issued command, the number of entries in the ring, said number of entries describing a structure of the memory ring data structure; and
    returning a status bit that indicates whether sufficient memory is available to cause data to be written successfully to the memory ring address identified by a pointer to a memory location where data is to be inserted, said pointer describing a structure of the memory ring.

16. The method of claim 13, the command further specifying a memory address from which to obtain data that is to be written to the memory ring.

17. The method of claim 16 wherein the data contains bite representing an output message from an executing program.

18. The method of claim 17 wherein the bits also include a programming engine identification and a context identification.

19. The method of claim 16 wherein the data contains bits representing a command address, said bits also include a programming engine identification and a context identification.

20. The method of claim 16 further comprising:
writing data to a memory ring address identified by the information describing a structure of the memory ring;
incrementing a pointer to the memory location where the data is to be inserted, said pointer describing a structure of the memory ring;
incrementing, by the specified length field, the number of entries in the ring, said number of entries describing a structure of the memory ring; and
storing the modified pointer and number of entries describing a structure of the memory ring in a cache memory having entries to store information describing a structure of a queue of data buffers.

21. The method of claim 20 wherein the cache memory can be used to store information about multiple memory ring data structures.

22. A method comprising:
receiving a request to read data from a memory ring data structure; and
issuing a command, in response to the request, specifying a pointer to a memory location from which the data is to be removed, said pointer describing a structure of the memory ring;
reading data from a memory ring address identified by the information describing a structure of the memory ring;
incrementing a pointer to a memory location from which data is to be removed, said pointer describing a structure of the memory ring;
decrementing the number of entries in the ring, said number of entries describing a structure of the memory ring; and
storing the modified pointer and number of entries which describe a structure of the memory ring in a cache memory having entries to store information describing a structure of a queue of data buffers.

23. The method of claim 22 wherein the command specifies a length field and wherein the number of entries in the ring is decremented by the specified length field.

24. The method of claim 22 further comprising:
returning an identifier to an issuing programming engine context, in response to the issued command, when the number of entries in the ring, said number of entries describing a structure of the memory ring, is less than the specified length field.

25. An apparatus comprising:
a processor providing a queue manager and a content addressable memory to store tags associated with buffer queues;
a first memory coupled to the processor to store a queue of data buffers and at least one of a queue of currently unused buffers or a ring data structure;
a cache memory coupled to the processor to store information describing a structure of the queue of data buffers and information describing at least one of a structure of the queue of currently unused buffers or a structure of the memory ring; and
a second memory to store instructions that, when applied to the processor, cause the processor to:
check the content addressable memory for a tag corresponding to the queue of data buffers;
access the information describing the structure of the queue of data buffers in the cache memory based on a result of the check;
remove a data buffer from the queue of data buffers using the information from the cache memory describing the structure of the queue of data buffers;
process information in the removed data butter; and
append the data buffer to a queue of currently unused buffers in response to an enqueue request.

26. The apparatus of claim 25 wherein the second memory further includes instructions to cause the processor to store currently unused buffers using a linked list data structure.

27. The apparatus of claim 25 wherein the second memory further includes instructions to cause the processor to store currently unused buffers using a stack data structure.

28. The apparatus of claim 25 wherein the second memory further includes instructions to cause the processor to modify information describing a structure of the queue of currently unused buffers.

29. The apparatus of claim 25 wherein the data buffer comprises a network packet and wherein the network packet comprises a packet received in a network processor.

30. An apparatus comprising:
a processor providing a queue manager and a content addressable memory to store tags associated with buffer queues;
a first memory coupled to the processor to store a queue of data buffers and at least one of a queue of currently unused buffers or a ring data structure;
a cache memory coupled to the processor to store information describing a structure of a queue of data buffers and information describing at least one of a structure of the queue of currently unused buffers or a structure of the memory ring; and
a second memory to store instructions that, when applied to the processor, cause the processor to:
remove a currently unused buffer from a queue of currently unused buffers in response to a dequeue request;
process a newly received data packet;
store the newly received data packet in the removed buffer;
check the content addressable memory for a tag corresponding to the queue of data buffers;
access the information describing the structure of the queue of data buffers in the cache memory based on a result of the check; and
append the removed buffer to the queue of data buffers using the queue descriptor from the cache memory.

31. The apparatus of claim 30 wherein the second memory further includes instructions to cause the processor to store currently unused buffers using a linked list data structure.

32. The apparatus of claim 30 wherein the second memory further includes instructions to cause the processor to store currently unused buffers using a stack data structure.

33. The apparatus of claim 30 wherein the data buffer comprises a network packet and wherein the network packet comprises a packet received in a network processor.

34. The apparatus of claim 30 wherein the second memory further includes instructions to cause the processor to modify information describing a structure of the queue of currently unused buffers.

35. An apparatus comprising:
a processor providing a queue manager;
a first memory coupled to the processor to store a queue of data buffers and at least one of a queue of currently unused buffers or a ring data structure;
a cache memory coupled to the processor to store information describing a structure of the queue of data buffers and information describing at least one of a structure of the queue of currently unused buffers or a structure of the memory ring; and a second memory to store instructions that, when applied to the processor, cause the processor to:

receive a request to write data to a memory ring data structure;

issue a command, in response to the request, the command specifying a pointer to a memory location where the data is to be inserted, said pointer describing a structure of the memory ring;

write data to a memory ring address identified by the information describing a structure of the memory ring;

increment a pointer to a memory location where data is to be inserted, said pointer describing a structure of the memory ring;

increment the number of entries in the ring, said number of entries describing a structure of the memory ring; and store the modified pointer and number of entries which describe a structure of the memory ring in a cache memory having entries to store information describing a structure of a queue of data buffers or a structure of a queue of currently unused buffers.

36. The apparatus of claim 35 wherein the command specifies a length field and wherein the number of entries in the ring is incremented by the specified length field.

37. The apparatus of claim 35 wherein the second memory further includes instructions to cause the processor to:

return to an issuing programming engine thread, in response to the issued command, the number of entries in the ring, said number of entries describing a structure of the memory ring data structure; and return a status bit that indicates whether sufficient memory is available to cause data to be written successfully to the memory ring address identified by a pointer to a memory location where data is to be inserted, said pointer describing a structure of the memory ring.

38. The apparatus of claim 35 wherein the command further specifies a memory address from which to obtain data that is to be written to the memory ring.

39. The apparatus of claim 38 wherein the data contains bits representing an output message from an executing program.

40. The apparatus of claim 39 wherein the bits also include a programming engine identification and a context identification.

41. The apparatus of claim 38 wherein the data contains bits representing a command address, said bits also include a programming engine identification and a context identification.

42. The apparatus of claim 38 wherein the second memory further includes instructions to cause the processor to:

write data to a memory ring address identified by the information describing a structure of the memory ring;

increment a pointer to the memory location where the data is to be inserted, said pointer describing a structure of the memory ring;

increment, by the specified length field, the number of entries in the ring, said number of entries describing a structure of the memory ring; and store the modified pointer and number of entries describing a structure of the memory ring in a cache memory having entries to store information describing a structure of a queue of data buffers.

43. The apparatus of claim 38 wherein the cache memory can be used to store information about multiple memory ring data structures.

44. An apparatus comprising:

a processor providing a queue manager;

a first memory coupled to the processor to store a queue of data buffers and at least one of a queue of currently unused buffers or a ring data structure;

a cache memory coupled to the processor to store information describing a structure of the queue of data buffers and information describing at least one of a structure of the queue of currently unused buffers or a structure of the memory ring; and a second memory to store instructions that, when applied to the processor, cause the processor to:

receive a request to read data from a memory ring data structure; and issue a command, in response to the request, specifying a pointer to a memory location from which the data is to be removed, said pointer describing a structure of the memory ring;

read data from a memory ring address identified by the information describing a structure of the memory ring;

increment a pointer to a memory location where data is to be removed, said pointer describing a structure of the memory ring;

decrement the number of entries in the ring, said number of entries describing a structure of the memory ring; and store the modified pointer and number of entries which describe a structure of the memory ring in a cache memory having entries to store information describing a structure of a queue of data buffers.

45. The apparatus of claim 44 wherein the command specifies a length field and wherein the number of entries in the ring is decremented by the specified length field.

46. The apparatus of claim 44 wherein the second memory further includes instructions to cause the processor to return an identifier to an issuing programming engine context, in response to the issued command, when the number of entries in the ring, said number of entries describing a structure of the memory ring is less than the specified length field.

47. A system comprising:

a source of data packets;

a destination of data packets; and a device operating to transfer data packets from the source to the destination comprising:

a processor providing a queue manager;

a first memory coupled to the processor to store a queue of data buffers and at least one of a queue of currently unused buffers or a ring data structure;

a cache memory coupled to the processor to store information describing a structure of the queue of data buffers and information describing at least one of a structure of the queue of currently unused buffers or a structure of the memory ring; and a second memory to store instructions that, when applied to the processor, cause the processor to:

remove a data buffer from a linked list of data buffers;

process information in the removed data buffer;

append the data buffer to a queue of currently unused buffers;

store information describing a structure of a queue of currently unused buffers and a queue of data buffers; and modify information describing a structure of the queue of currently unused buffers.

48. The system of claim 47 wherein the storing is performed using the cache memory having entries to store information describing a structure of a queue of data buffers or a structure of a queue of currently unused buffers.

49. The system of claim 47 comprising the second memory storing instructions that, when applied to the processor, further cause the processor to store currently unused buffers using a linked list data structure.

50. The system of claim 47 wherein the data buffer comprises a network packet and wherein the network packet comprises a packet received in a network processor.

51. A system comprising:
a source of data packets;
a destination of data packets; and
a device operating to transfer data packets from the source to the destination comprising:
  a processor providing a queue manager;
  a first memory coupled to the processor to store a queue of data buffers and at least one of a queue of currently unused buffers or a ring data structure;
  a cache memory coupled to the processor to store information describing a structure of a queue of data buffers and information describing at least one of a structure of the queue of currently unused buffers or a structure of the memory ring; and
  a second memory to store instructions that, when applied to the processor, cause the processor to:
    remove a currently unused buffer from a queue of currently unused buffers;
    process a newly received data packet;
    store the newly received data packet in the removed buffer;
    append the removed buffer to a linked list of data buffers;
    store information describing a structure of a queue of currently unused buffers and a queue of data buffers in a cache memory having entries to store information describing a structure of a queue of data buffers or a structure of a queue of currently unused buffers; and
    modify information describing a structure of the queue of currently unused buffers.

52. The system of claim 51 comprising the second memory storing instructions that, when applied to the processor, further cause the processor to store currently unused buffers using a linked list data structure.

53. An article comprising a storage medium having stored thereon instructions that, when executed by a machine, cause the machine to:
check a content addressable memory for a tag corresponding to a queue of data buffers associated with a dequeue request;
access a queue descriptor, for the queue of data buffers, in a cache memory based on a result of the check;
remove a data buffer from the queue of data buffers using the queue descriptor from the cache memory
process information in the removed data buffer; and
append the data buffer to a queue of currently unused buffers in response to an enqueue request.

54. The article of claim 53 including instructions that, when executed by a machine, cause the machine to store currently unused buffers using a linked list data structure.

55. The article of claim 53 further including instructions that, when executed by a machine, cause the machine to store currently unused buffers using a stack data structure.

56. The article of claim 53 wherein the data buffer comprises a network packet and wherein the network packet comprises a packet received in a network processor.

57. The article of claim 53 further including instructions that, when executed by a machine, cause the machine to modify information describing a structure of the queue of currently unused buffers.

58. The article of claim 57 wherein the removing is performed in response to receiving a data packet in a receive pipeline appending and modifying are performed in response to receiving the enqueue request.

59. An article comprising a storage medium having stored thereon instructions that, when executed by a machine, cause the machine to:
remove a currently unused buffer from a queue of currently unused buffers in response to a dequeue request;
process a newly received data packet;
store the newly received data packet in the removed buffer;
check a content addressable memory for a tag corresponding to a queue of data buffers associated with an enqueue request;
access a queue descriptor, for the queue of data buffers, in a cache memory based on a result of the check;
append the removed buffer to the queue of data buffers using the queue descriptor from the cache memory.

60. The article of claim 59 further including instructions that, when executed by a machine, cause the machine to store currently unused buffers using a linked list data structure.

61. The article of claim 59 further including instructions that, when executed by a machine, cause the machine to store currently unused buffers using a stack data structure.

62. The article of claim 59 wherein the data buffer comprises a network packet and wherein the network packet comprises a packet received in a network processor.

63. The article of claim 59 further including instructions that, when executed by a machine, cause the machine to modify information describing a structure of the queue of currently unused buffers.

64. The article of claim 63 wherein the removing is performed in response to receiving a data packet in the receive pipeline, and storing and modifying are performed in response to receiving the dequeue request.

65. An article comprising a storage medium having stored thereon instructions that, when executed by a machine, cause the machine to:
receive a request to write data to a memory ring data structure; and
issue a command, in response to the request, the command specifying a pointer to a memory location where the data is to be inserted, said pointer describing a structure of the memory ring;
write data to a memory ring address identified by the information describing a structure of the memory ring;
increment a pointer to a memory location where data is to be inserted, said pointer describing a structure of the memory ring;
increment the number of entries in the ring, said number of entries describing a structure of the memory ring; and
store the modified pointer and number of entries which describe a structure of the memory ring in a cache memory having entries to store information describing a structure of a queue of data buffers or a structure of a queue of currently unused buffers.

66. The article of claim 65 wherein the command specifies a length field and wherein the number of entries in the ring is incremented by the specified length field.

67. The article of claim 65 further including instructions that, when executed by a machine, cause the machine to:
return to an issuing programming engine thread, in response to the issued command the number of entries in the ring, said number of entries describing a structure of the memory ring data structure; and
return a status bit that indicates whether sufficient memory is available to cause data to be written successfully to the memory ring address identified by a pointer to a the memory location where data is to be inserted, said pointer describing a structure of the memory ring.

68. The article of claim 65 wherein the command further specifies a memory address from which to obtain data that is to he written to the memory ring.

69. The article of claim 68 wherein the data contains bits representing an output message from an executing program.

70. The article of claim 69 wherein the bits include a programming engine identification and a context identification.

71. The article of claim 68 wherein the data contains bits representing a command address, said bits also include a programming engine identification and a context identification.

72. The article of claim 68 further including instructions that, when executed by a machine, cause the machine to:
write data to a memory ring address identified by the information describing a structure of the memory ring;
increment a pointer to the memory location where the data is to be inserted, said pointer describing a structure of the memory ring;
increment, by the specified length field, the number of entries in the ring, said number of entries describing a structure of the memory ring; and
store the modified pointer and number of entries describing a structure of the memory ring in a cache memory of which a subset of entries may be used to store information describing a queue of data buffers.

73. The article of claim 68 wherein the cache memory can be used to store information about multiple memory ring data structures.

74. An article comprising a storage medium having stored thereon instructions that, when executed by a machine, cause the machine to:
receive a request to read data from a memory ring data structure; and
issue a command, in response to the request, specifying a pointer to a memory location where the data is to be removed, said pointer describing a structure of the memory ring;
read data from a memory ring address identified by the information describing a structure of the memory ring;
increment a pointer to a memory location where data is to be removed, said pointer describing a structure of the memory ring;
decrement the number of entries in the ring, said number of entries describing a structure of the memory ring; and
store the modified pointer and number of entries describing a structure of the memory ring in a cache memory having entries to store information describing a structure of a queue of data buffers.

75. The article of claim 74 wherein the command specifies a length field and wherein the number of entries in the ring is decremented by the specified length field.

76. The article of claim 74 further including instructions that, when executed by a machine, cause the machine to return an identifier to an issuing programming engine context, in response to the issued command, when the number of entries in the ring, said number of entries describing a structure of the memory ring, is less than the specified length field.

* * * * *